(12) United States Patent
Tomi

(10) Patent No.: US 7,497,969 B2
(45) Date of Patent: *Mar. 3, 2009

(54) LIQUID CRYSTAL COMPOSITION AND LIQUID CRYSTAL DISPLAY ELEMENT

(75) Inventor: Yoshitaka Tomi, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 289 days.

This patent is subject to a terminal disclaimer.

(21) Appl. No.: 11/166,225

(22) Filed: Jun. 27, 2005

(65) Prior Publication Data

US 2005/0285081 A1 Dec. 29, 2005

(30) Foreign Application Priority Data

Jun. 28, 2004 (JP) ............... 2004-189530
Dec. 16, 2004 (JP) ............... 2004-364426
May 18, 2005 (JP) ............... 2005-145185

(51) Int. Cl.
*C09K 19/00* (2006.01)
*C09K 19/52* (2006.01)

(52) U.S. Cl. ............... 252/299.01; 252/299.6; 252/299.63; 252/299.66; 428/1.1; 430/20

(58) Field of Classification Search ............ 252/299.01, 252/299.6, 299.63, 299.66; 428/1.1; 430/20
See application file for complete search history.

(56) References Cited

U.S. PATENT DOCUMENTS 5,723,068 A 3/1998 Hachiya et al.
6,174,457 B1 * 1/2001 Kato et al. ............. 252/299.63

FOREIGN PATENT DOCUMENTS

| EP | 0 781 826 A1 | 7/1997 |
| JP | 06-220454 | 8/1994 |
| JP | 09-071779 | 3/1997 |
| JP | 09-087626 | 3/1997 |
| JP | 09-087627 | 3/1997 |
| JP | 09-087628 | 3/1997 |

* cited by examiner

*Primary Examiner*—Geraldina Visconti
(74) *Attorney, Agent, or Firm*—Hogan & Hartson LLP

(57) ABSTRACT

A liquid crystal composition including a compound of formula (1), a compound of formula (2), a compound of formula (3), and a compound of formula (4):

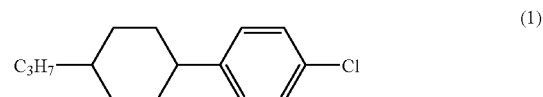

(1)

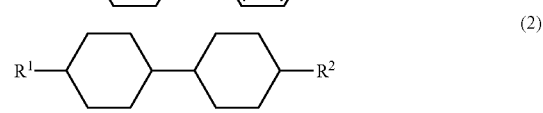

(2)

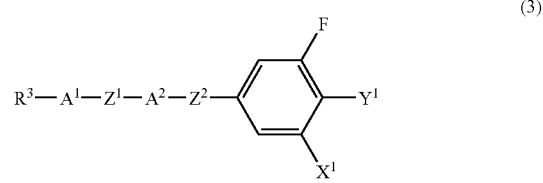

(3)

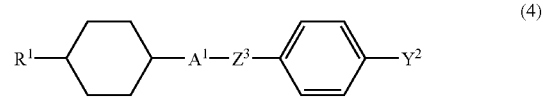

(4)

wherein $R^1$ and $R^2$ are independently an alkyl group; $R^3$ is an alkyl or alkenyl group; $Y^1$ is fluorine or $-OCF_3$; $Y^2$ is an alkyl group, an alkoxy group, fluorine, chlorine, or $-OCF_3$; $X^1$ is hydrogen or fluorine; $A^1$ is 1,4-cyclohexylene or 1,4-phenylene; $A^2$ is 1,4-cyclohexylene, 1,4-phenylene or 2,6-difluoro-1,4-phenylene; $Z^1$ is a single bond or $-(CH_2)_2-$; $Z^2$ is a single bond, $-(CH_2)_2-$, $-COO-$, or $-CF_2O-$; and $Z^3$ is a single bond or $-COO-$.

8 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates mainly to a liquid crystal composition suitable for use in an active matrix (AM) element, and an AM element containing the composition.

2. Related Art

On a liquid crystal display element, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These elements contain a liquid crystal composition having suitable characteristics. General characteristics of the composition should be improved to obtain an AM element having good general characteristics. Table 1 below summarizes a relationship between the general characteristics of the two. The general characteristics of the composition will be explained further based on a commercially available AM element. A temperature range of a nematic phase relates to the temperature range in which the element can be used. A desirable maximum temperature of the nematic phase is 70° C. or more and a desirable minimum temperature is −20° C. or less. The viscosity of the composition relates to the response time of the element. A short response time is desirable for displaying a moving image. Accordingly, a small viscosity of the composition is desirable. A small viscosity at a low temperature is more desirable.

TABLE 1

| No. | General Composition Characteristics | General AM Element Characteristics |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Threshold voltage is low | Electric power consumption is small and a contrast ratio is large |
| 5 | Specific resistance is large | Voltage holding ratio is large and a contrast ratio is large |

Note:
[1]A liquid crystal composition can be injected into a cell in a short time.

The optical anisotropy of the composition relates to the contrast ratio of the element. A product (Δn·d) of the optical anisotropy (Δn) of the composition and the cell gap (d) of the element is designed to be approximately 0.45 micrometers to maximize the contrast ratio of the element. Accordingly, the optical anisotropy of the composition is in the range of 0.08 to 0.12. A low threshold voltage of the composition contributes to a small electric power consumption and a large contrast ratio of the element. Accordingly, a low threshold voltage is desirable. A large specific resistance of the composition contributes to a large voltage holding ratio and a large contrast ratio of the element. Accordingly, a composition having a large specific resistance is desirable at room temperature and also at a high temperature in the initial stage. A composition having a large specific resistance is desirable at room temperature and also at a high temperature after it has been used for a long time.

A desirable AM element has characteristics that a usable temperature range is wide, that a response time is short, that a contrast ratio is large, and so forth. Even one millisecond shorter response time is desirable. Thus, the composition having characteristics such as a high maximum temperature of a nematic phase, a low minimum temperature of a nematic phase, a small viscosity, a low threshold voltage, a large specific resistance, and so forth is especially desirable. Compositions and elements of the related art are disclosed in the following patent documents. JP H8-239665A/1996 (U.S. Pat. No. 5,723,068), JP H9-071779 A/1997, JP H9-087626 A/1997, JP H9-087627 A/1997, JP H9-087628 A/1997, JP H9-176645 A/1997 (EP 781 826A).

SUMMARY OF THE INVENTION

The present invention concerns a liquid crystal composition that includes a first component that is at least one compound represented by formula (1) in the range of approximately 10% to approximately 35% by weight, a second component that is at least one compound represented by formula (2) in the range of approximately 20% to approximately 40% by weight, a third component that is at least one compound represented by formula (3), and a fourth component that is at least one compound represented by formula (4):

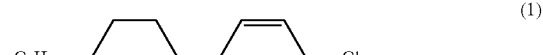
(1)

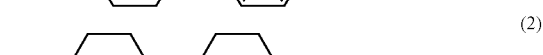
(2)

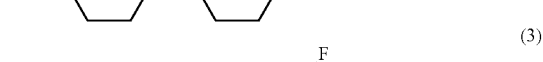
(3)

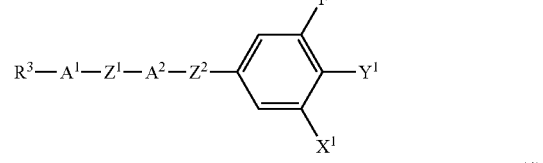
(4)

wherein $R^1$ and $R^2$ are independently an alkyl group having 1 to 12 carbons; $R^3$ is an alkyl group having 1 to 12 carbons or an alkenyl group having 2 to 12 carbons; $Y^1$ is fluorine or —$OCF_3$; $Y^2$ is an alkyl group having 1 to 12 carbons, an alkoxy group having 1 to 12 carbons, fluorine, chlorine, or —$OCF_3$; $X^1$ is hydrogen or fluorine; $A^1$ is 1,4-cyclohexylene or 1,4-phenylene; $A^2$ is 1,4-cyclohexylene, 1,4-phenylene or 2,6-difluoro-1,4-phenylene; $Z^1$ is a single bond or —($CH_2$)$_2$—; $Z^2$ is a single bond, —($CH_2$)$_2$—, —COO—, or —$CF_2$O—; and $Z^3$ is a single bond or —COO—. The present invention also concerns a liquid crystal display element containing the composition, the use of the composition, and so forth.

DETAILED DESCRIPTION

Terms used in the specification and claims are defined as follows. The liquid crystal composition of the present invention or the liquid crystal display element of the present invention may occasionally be expressed simply as "the composition" or "the element", respectively. A liquid crystal display element is a generic term for a liquid crystal display panel and a liquid crystal display module. Main components of the liquid crystal composition are liquid crystal compounds. The liquid crystal compound is a generic term for a compound having a liquid crystal phase such as a nematic phase, a smectic phase and so forth, and also for a compound having no liquid crystal phase but being useful as a component of a composition. At least one compound selected from a group of compounds represented by formula (1) may be abbreviated to "the compound (1)". The phrase of "at least one compound represented by formula (3-1) or (3-2)" means at least one compound selected from the group of the compounds represented by formulas (3-1) and (3-2).

The phrase of "a homologue of the compound (1)" means the compound of the following formula in which n is 1, 2, 4, 5, 6, 7, 8, 9, 10, 11, or 12 (n is not 3).

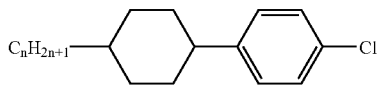

A higher limit of a temperature range of a nematic phase may be abbreviated to "a maximum temperature". A lower limit of a temperature range of a nematic phase may be abbreviated to "a minimum temperature". "A specific resistance is large" means that the composition has a large specific resistance at room temperature and also at a high temperature in the initial stage, and the composition has a large specific resistance at room temperature and also at a high temperature even after it has been used for a long time. "A voltage holding ratio is large" means that an element has a large voltage holding ratio at room temperature and also at a high temperature in the initial stage, and the element has a large voltage holding ratio at room temperature and also at a high temperature even after it has been used for a long time. The characteristics such as optical anisotropy and so forth are explained in terms of values measured by means of the methods specified in the Examples. The content (percentage) of a liquid crystal compound in a composition means the percentage by weight (% by weight) based on the total weight of liquid crystal compounds.

An advantage of the present invention is to provide a liquid crystal composition which satisfies many characteristics among the characteristics such as a high maximum temperature of a nematic phase, a low minimum temperature of a nematic phase, a small viscosity, a suitable optical anisotropy, a low threshold voltage and a large specific resistance. One aspect of the invention is to provide a liquid crystal composition properly balanced regarding many characteristics. Another aspect of the invention is to provide a liquid crystal display element containing such a composition. A further aspect of the invention is to provide an AM element containing a composition with a small viscosity, an optical anisotropy ranging from 0.08 to 0.12 and a low threshold voltage, and having characteristics such as a short response time, a large voltage holding ratio, and so forth. Among them, the important aspect is a short response time of the element.

The present invention has the following features. Percentage by weight described here corresponds to the total amount of component compounds of the first component (or the second component and so forth).

1. A liquid crystal composition including a first component that is at least one compound represented by formula (1) in the range of approximately 10% to approximately 35% by weight, a second component that is at least one compound represented by formula (2) in the range of approximately 20% to approximately 40% by weight, a third component that is at least one compound represented by formula (3), and a fourth component that is at least one compound represented by formula (4):

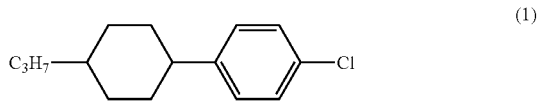

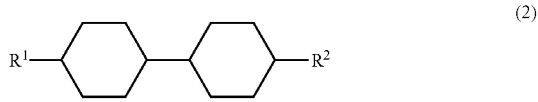

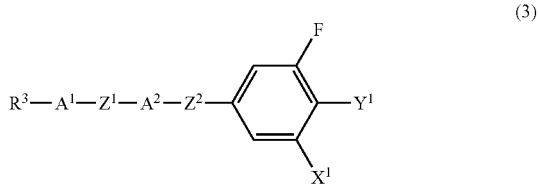

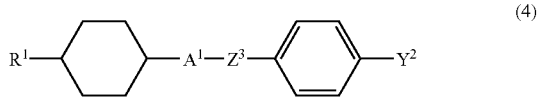

wherein $R^1$ and $R^2$ are independently an alkyl group having 1 to 12 carbons; $R^3$ is an alkyl group having 1 to 12 carbons or an alkenyl group having 2 to 12 carbons; $Y^1$ is fluorine or —$OCF_3$; $Y^2$ is an alkyl group having 1 to 12 carbons, an alkoxy group having 1 to 12 carbons, fluorine, chlorine, or —$OCF_3$; $X^1$ is hydrogen or fluorine; $A^1$ is 1,4-cyclohexylene or 1,4-phenylene; $A^2$ is 1,4-cyclohexylene, 1,4-phenylene or 2,6-difluoro-1,4-phenylene; $Z^1$ is a single bond or —($CH_2$)$_2$—; $Z^2$ is a single bond, —($CH_2$)$_2$—, —COO—, or —$CF_2O$—; and $Z^3$ is a single bond or —COO—.

2. The liquid crystal composition according to item 1, wherein the third component is in the range of approximately 10% to approximately 45% by weight, and the fourth component is in the range of approximately 10% to approximately 55% by weight.

3. The liquid crystal composition according to item 1, wherein the second component is in the range of approximately 20% to approximately 30% by weight, the third component is in the range of approximately 10% to approximately 45% by weight, and the fourth component is in the range of approximately 10% to approximately 55% by weight, and which further contains at least one compound represented by formula (5) or (6) in the range of approximately 1% to approximately 20% by weight as the fifth component:

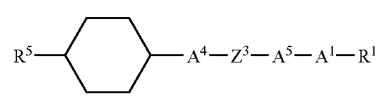

(5)

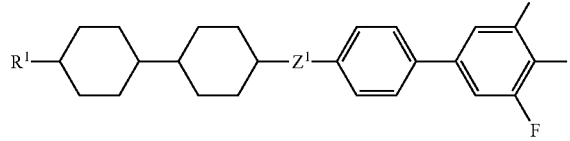

(6)

wherein $R^1$ is an alkyl group having 1 to 12 carbons; $R^5$ is an alkyl group having 1 to 12 carbons or an alkoxymethyl group having 2 to 12 carbons; $A^1$ is 1,4-cyclohexylene or 1,4-phenylene; $A^4$ is 1,4-cyclohexylene, 1,4-phenylene or 2-fluoro-1,4-phenylene; $A^5$ is 1,4-phnenylene or 2-fluoro-1,4-phenylene; $Z^1$ is a single bond or —(CH$_2$)$_2$—; and $Z^3$ is a single bond or —COO—.

4. The liquid crystal composition according to any one of items 1 to 3, which does not contain any homologue of the compound represented by formula (1).

5. A liquid crystal composition including a first component that is at least one compound represented by formula (1) in the range from approximately 10% to approximately 35% by weight, a second component is at least one compound represented by formula (2) in the range from approximately 20% to approximately 30% by weight, a third component that is at least one compound represented by formula (3-2) in the range from approximately 10% to approximately 45% by weight, a fourth component that is at least one compound represented by formula (4-1) and at least one compound represented by formula (4-2) in the range of approximately 10% to approximately 55% by weight, and a fifth component that is at least one compound represented by formula (5-1) or at least one compound represented by formula (6-1):

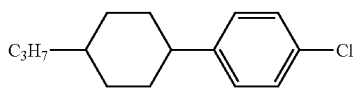

(1)

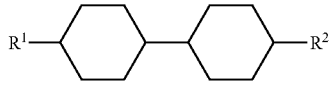

(2)

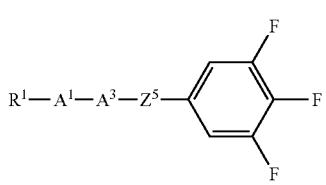

(3-2)

(4-1)

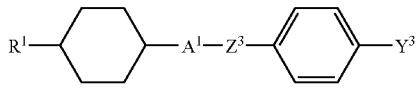

(4-2)

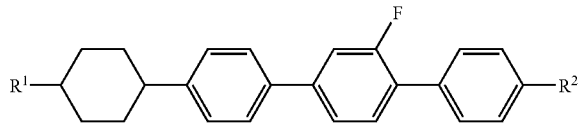

(5-1)

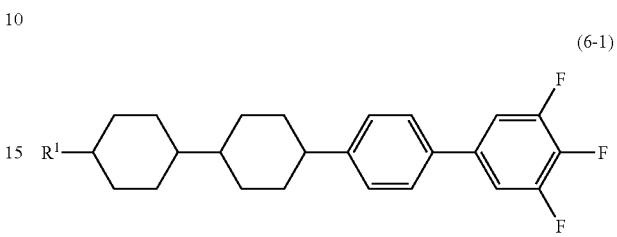

(6-1)

wherein $R^1$ and $R^2$ are independently an alkyl group having 1 to 12 carbons; $R^4$ is an alkyl group having 1 to 12 carbons or an alkoxy group having 1 to 12 carbons; $Y^3$ is fluorine or chlorine; $A^1$ is 1,4-cyclohexylene or 1,4-phenylene; $A^3$ is 1,4-phenylene or 2,6-difluoro-1,4-phenylene; $Z^3$ is a single bond or —COO—; and $Z^5$ is a single bond or —CF$_2$O—.

6. The liquid crystal composition according to item 5, wherein the fifth component is at least one compound represented by formula (5-1) in the range of approximately 1% to approximately 20% by weight:

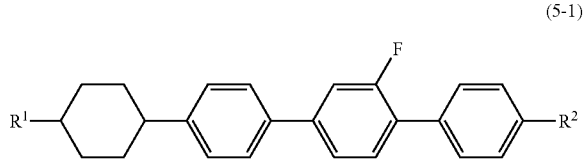

(5-1)

wherein $R^1$ and $R^2$ are independently an alkyl group having 1 to 12 carbons.

7. The liquid crystal composition according to item 5, wherein the fifth component is at least one compound represented by formula (6-1) in the range of approximately 1% to approximately 20% by weight:

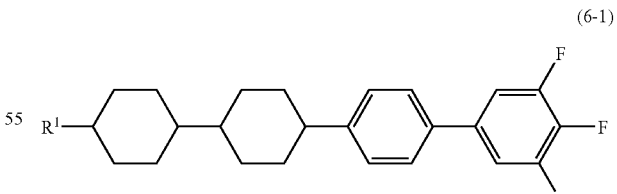

(6-1)

wherein $R^1$ is an alkyl group having 1 to 12 carbons.

8. The liquid crystal composition according to item 5, wherein the fifth component is at least one compound represented by formula (5-1) and at least one compound represented by formula (6-1) in the range of approximately 1% to approximately 20% by weight:

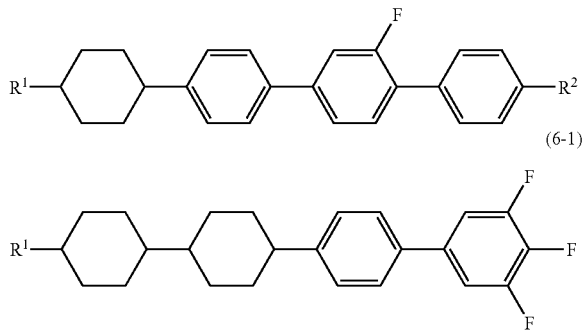

(5-1)

(6-1)

wherein $R^1$ and $R^2$ are independently an alkyl group having 1 to 12 carbons.

9. The liquid crystal composition according to item 5, wherein the third component is at least one compound represented by formula (3-1) and at least one compound represented by formula (3-2) in the range of approximately 10% to approximately 45% by weight, and the fifth component is at least one compound represented by formula (5-1) and at least one compound represented by formula (6-1) in the range of approximately 1% to approximately 20% by weight:

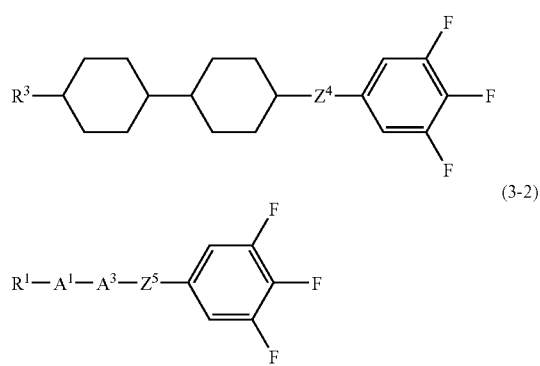

(3-1)

(3-2)

(5-1)

(6-1)

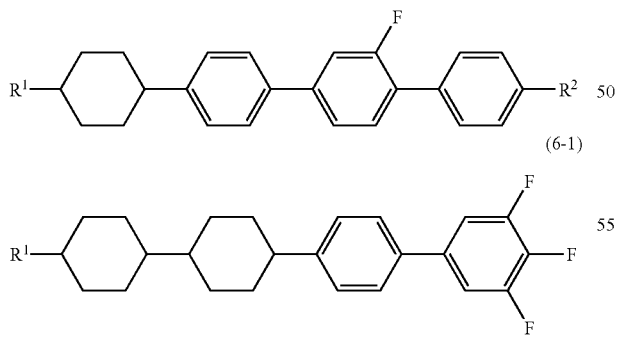

wherein $R^1$ and $R^2$ are independently an alkyl group having 1 to 12 carbons; $R^3$ is an alkyl group having 1 to 12 carbons or an alkenyl group having 2 to 12 carbons; $A^1$ is 1,4-cyclohexylene or 1,4-phenylene; $A^3$ is 1,4-phenylene or 2,6-difluoro-1,4-phenylene; $Z^4$ is a single bond, —COO— or —CF$_2$O—; and $Z^5$ is a single bond or —CF$_2$O—.

10. The liquid crystal composition according to any one of items 5 to 9, wherein the second component is in the range of approximately 26% to approximately 30% by weight.

11. The liquid crystal composition according to any one of items 5 to 10, which does not contain any homologue of the compound represented by formula (1).

12. The liquid crystal composition according to item 5, wherein the third component is at least one compound represented by formula (3-2-14) in the range of approximately 10% to approximately 45% by weight and the fifth component is at least one compound represented by formula (6-1) in the range of approximately 1% to approximately 20% by weight:

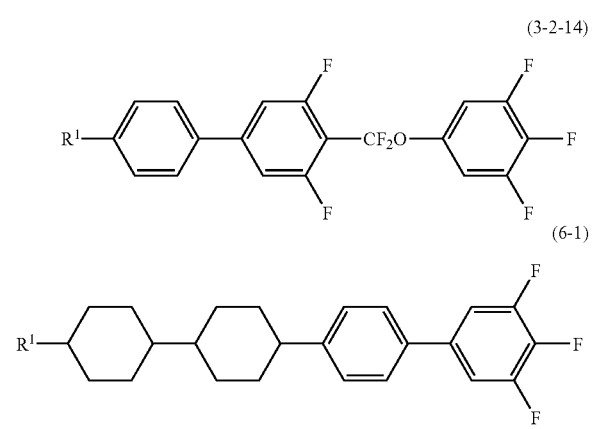

(3-2-14)

(6-1)

wherein $R^1$ is an alkyl group having 1 to 12 carbons.

13. The liquid crystal composition according to item 5, wherein the third component is at least one compound represented by formula (3-2-7) and at least one compound represented by formula (3-2-14) in the range of approximately 10% to approximately 45% by weight:

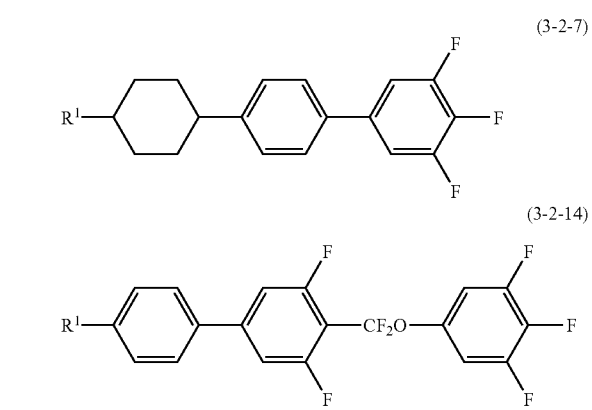

(3-2-7)

(3-2-14)

wherein $R^1$ is an alkyl group having 1 to 12 carbons.

14. The liquid crystal composition according to item 5, wherein the third component is at least one compound represented by formula (3-2-7) and at least one compound represented by formula (3-2-14) in the range of approximately 10% to approximately 45% by weight and the fifth component is at least one compound represented by formula (5-1) and at least one compound represented by formula (6-1) in the range of approximately 1% to approximately 20% by weight:

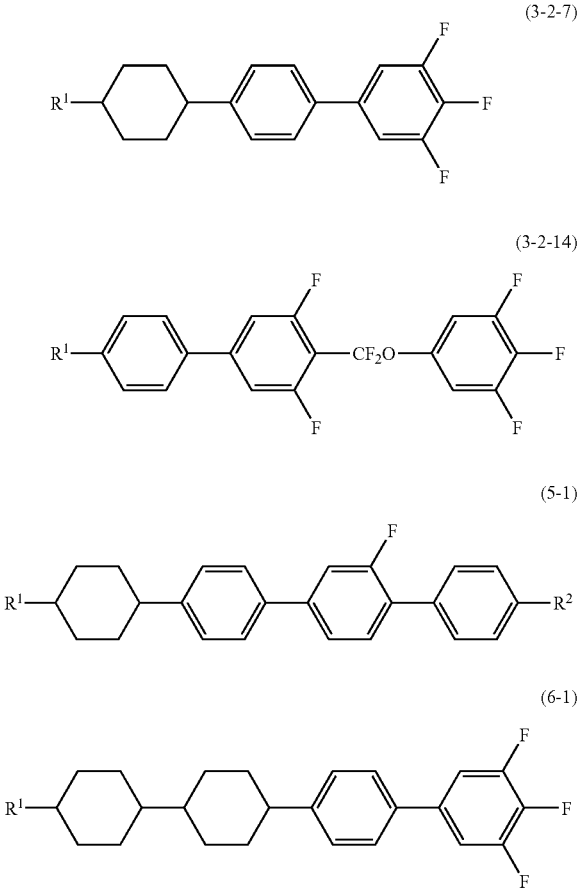

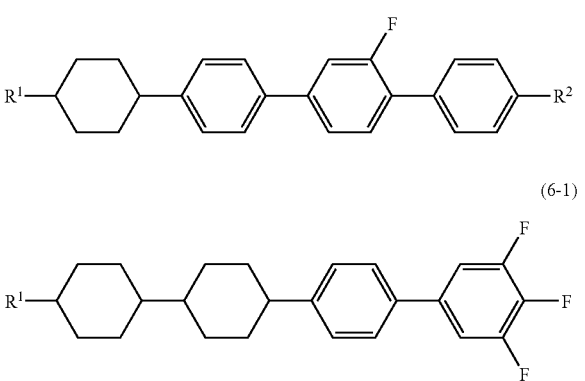

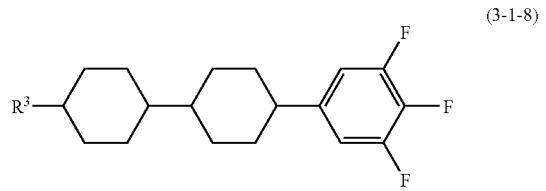

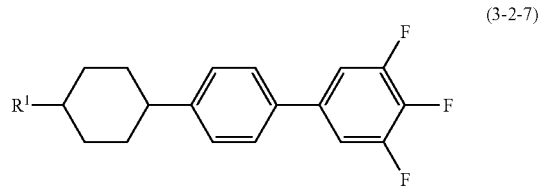

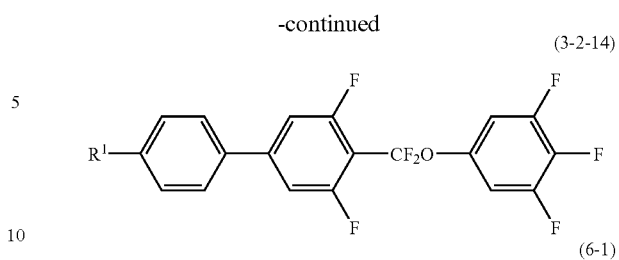

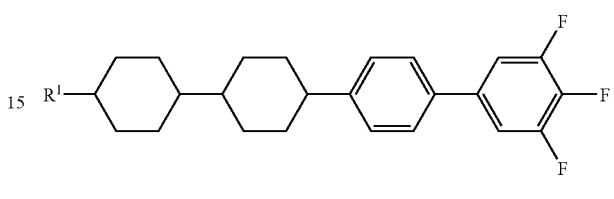

wherein $R^1$ and $R^2$ are independently an alkyl group having 1 to 12 carbons.

15. The liquid crystal composition according to item 5, wherein the third component is at least one compound represented by formula (3-1-8), at least one compound represented by formula (3-2-7) and at least one compound represented by formula (3-2-14) in the range of approximately 10% to approximately 45% by weight and the fifth component is at least one compound represented by formula (6-1) in the range of approximately 1% to approximately 20% by weight:

wherein $R^1$ is an alkyl group having 1 to 12 carbons; $R^3$ is an alkyl group having 1 to 12 carbons or an alkenyl group having 2 to 12 carbons.

16. The liquid crystal composition according to any one of items 12 to 15, which does not contain any homologue of the compound represented by formula (1).

17. A liquid crystal composition consisting essentially of a first component that is at least one compound represented by formula (1) in the range of approximately 10% to approximately 35% by weight, a second component that is at least one compound represented by formula (2) in the range from approximately 26% to approximately 40% by weight, a third component that is at least one compound represented by formula (3) in the range from approximately 10% to approximately 45% by weight, and a fourth component that is at least one compound represented by formula (4) in the range from approximately 10% to approximately 55% by weight:

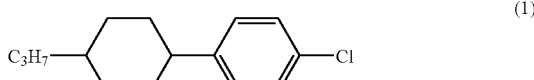

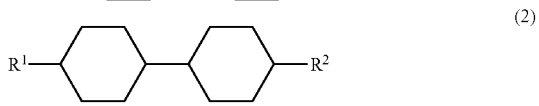

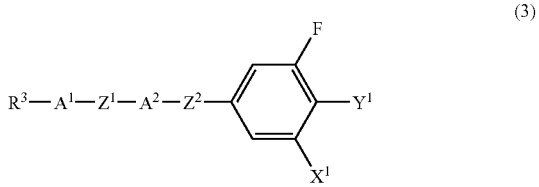

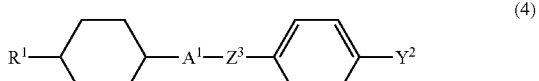

wherein $R^1$ and $R^2$ are independently an alkyl group having 1 to 12 carbons; $R^3$ is an alkyl group having 1 to 12 carbons or an alkenyl group having 2 to 12 carbons; $Y^1$ is fluorine or —OCF$_3$; $Y^2$ is an alkyl group having 1 to 12 carbons, an alkoxy group having 1 to 12 carbons, fluorine, chlorine, or —OCF$_3$; $X^1$ is hydrogen or fluorine; $A^1$ is 1,4-cyclohexylene or 1,4-phenylene; $A^2$ is 1,4-cyclohexylene, 1,4-phenylene or 2,6-difluoro-1,4-phenylene; $Z^1$ is a single bond or —(C $H_2)_2$—; $Z^2$ is a single bond, —$(CH_2)_2$—, —COO—, or —$CF_2O$—; and $Z^3$ is a single bond or —COO—.

18. The liquid crystal composition according to item 17, wherein the third component is at least one compound represented by formula (3-2) in the range of approximately 10% to approximately 45% by weight, and the fourth component is at least one compound represented by formula (4-1) and at least one compound represented by formula (4-2) in the range of approximately 10% to approximately 55% by weight:

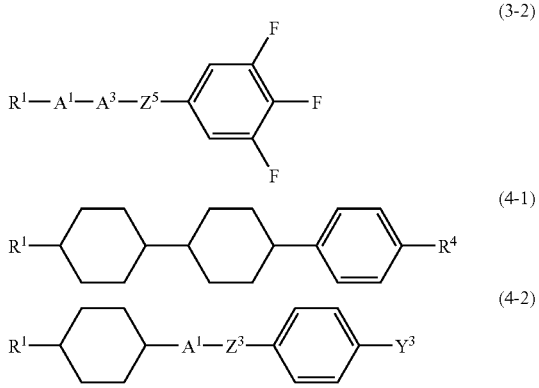

wherein $R^1$ is an alkyl group having 1 to 12 carbons; $R^4$ is an alkyl group having 1 to 12 carbons or an alkoxy group having 1 to 12 carbons; $Y^3$ is fluorine or chlorine; $A^1$ is 1,4-cyclohexylene or 1,4-phenylene; $A^3$ is 1,4-phenylene or 2,6-difluoro-1,4-phenylene; $Z^3$ is a single bond or —COO—; and $Z^5$ is a single bond or —$CF_2O$—.

19. The liquid crystal composition according to item 17, wherein the third component is at least one compound represented by formula (3-2-7) in the range of approximately 10% to approximately 45% by weight, and the fourth component is at least one compound represented by formula (4-1) and at least one compound represented by formula (4-2) in the range of approximately 10% to approximately 55% by weight:

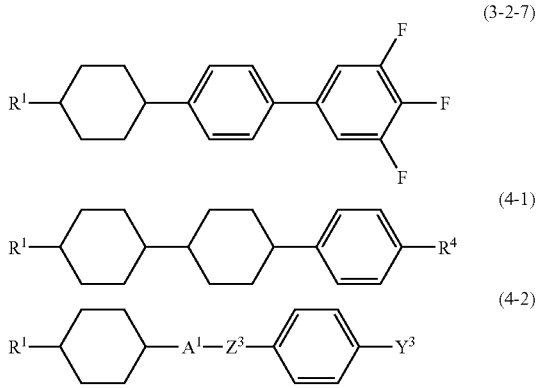

wherein $R^1$ is an alkyl group having 1 to 12 carbons; $R^4$ is an alkyl group having 1 to 12 carbons or an alkoxy group having 1 to 12 carbons; $Y^3$ is fluorine or chlorine; $A^1$ is 1,4-cyclohexylene or 1,4-phenylene; and $Z^3$ is a single bond or —COO—.

20. The liquid crystal composition according to item 17, wherein the third component is at least one compound represented by formula (3-2-14) in the range of approximately 10% to approximately 45% by weight, the fourth component is at least one compound represented by formula (4-1) and at least one compound represented by formula (4-2) in the range of approximately 10% to approximately 55% by weight:

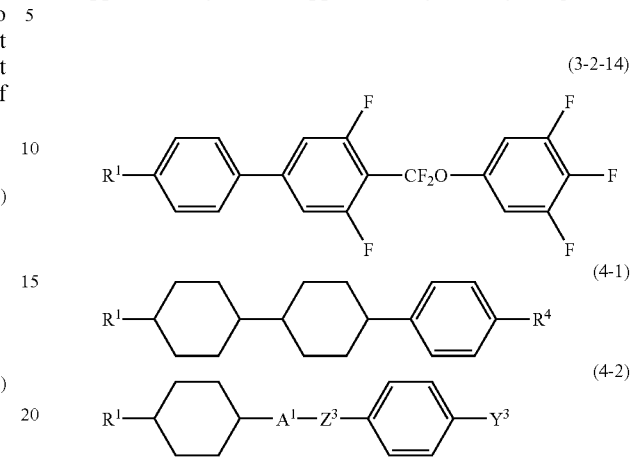

wherein $R^1$ is an alkyl group having 1 to 12 carbons; $R^4$ is an alkyl group having 1 to 12 carbons or an alkoxy group having 1 to 12 carbons; $Y^3$ is fluorine or chlorine; $A^1$ is 1,4-cyclohexylene or 1,4-phenylene; and $Z^3$ is a single bond or —COO—.

21. The liquid crystal composition according to any one of items 1 to 20, which further contains an antioxidant.

22. The liquid crystal composition according to item 21, wherein the antioxidant is the compound represented by formula (9):

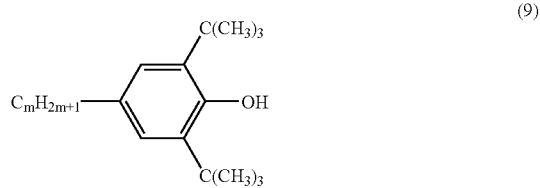

wherein m is an integer from 1 to 9.

23. The liquid crystal composition according to item 21 or 22, wherein the antioxidant is in the range of approximately 50 to approximately 600 ppm based on the total weight of the liquid crystal compounds.

24. A liquid crystal display element containing the liquid crystal composition according to any one of items 1 to 23.

The present invention also includes the following items. 1) The composition described above, wherein the optical anisotropy is in the range from approximately 0.08 to approximately 0.12. 2) The composition described above, wherein the maximum temperature of the nematic phase is approximately 70° C. or more and the minimum temperature is approximately −20° C. or less. 3) The composition described above, which further contains an optically active compound. 4) An AM element containing the composition described above. 5) The element containing the composition described above and having the mode of TN, ECB, OCB, or IPS. 6) The element of a transmission type, containing the composition described above. 7) Use of the composition described above as a composition having a nematic phase. 8) Use as an optically active composition by adding an optically active compound to the composition described above.

Advantages of the present invention are as described above. An important advantage among them is a short response time of the element. A composition having a small viscosity is desirable to make a response time short. Thus, the compound (2) was chosen as an essential component. A larger ratio of the compound (2) in the composition is desirable to decrease a viscosity. However, the compound (2) in a too large ratio increases the minimum temperature of the composition. We found that the combination of the compound (2) with the compound (1) is quite effective in preventing the increase in the minimum temperature. We also found that the compound (1) is effective for characteristics such as a low minimum temperature of the composition, a short response-time of the element, and so forth, in comparison with its homologues. Based on these findings, we further combined the compound (3) having a large dielectric anisotropy, the compound (4) having a high maximum temperature, and so forth. As the results, we could obtain the composition having properly balanced characteristics such as a high maximum temperature, a low minimum temperature, a small viscosity, a short response time, a suitable optical anisotropy, a low threshold voltage, and so forth.

For reference, the compound (1) was compared with its homologue. The compositions containing these compounds were prepared and their characteristics were measured for comparison. Results are summarized in Table 2. Each ratio of the component compounds was controlled to make the characteristics of a maximum temperature, an optical anisotropy and a threshold voltage same in the two compositions. The compound (1) is superior to its homologue regarding characteristics such as a low minimum temperature, a short response time, and so forth. The homologue of the compound (1) is suitable for preparing the composition having a large specific resistance. However, the homologue is not best for preparing a composition having a lower minimum temperature and a smaller viscosity.

TABLE 2

Point of Invention

| Component Compound and its Ratio | Composition Containing Compound (1) | Composition Containing Homologue of Compond (1) |
|---|---|---|
| $C_3H_7$–(Cy)–(Ph)–Cl | 16 | none |
| $C_5H_{11}$–(Cy)–(Ph)–Cl | none | 19 |
| $C_2H_5$–(Cy)–(Cy)–$C_5H_{11}$ | 5 | 5 |
| $C_3H_7$–(Cy)–(Cy)–$C_4H_9$ | 17 | 17 |
| $C_3H_7$–(Cy)–(Cy)–$C_5H_{11}$ | 5 | 5 |
| $C_3H_7$–(Cy)–(Ph)–(Ph-3,4,5-F$_3$) | 29 | 29 |
| $C_3H_7$–(Cy)–(Cy)–(Ph)–$C_3H_7$ | 9 | 6 |
| $C_2H_5$–(Cy)–(Cy)–(Ph)–Cl | 5 | 5 |
| $C_3H_7$–(Cy)–(Cy)–(Ph)–Cl | 7 | 7 |

TABLE 2-continued

Point of Invention

| | | Composition Containing Compound (1) | Composition Containing Homologue of Compond (1) |
|---|---|---|---|
| | 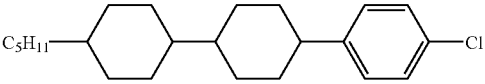 | 7 | 7 |
| Characteristics | Maximum Temperature (° C.) | 80.4 | 78.3 |
| | Minumum Temperature (° C.) | ≦−30 | ≦−10 |
| | Viscosity (mPa · s) | 14.3 | 15.3 |
| | Optical Anisotropy | 0.093 | 0.092 |
| | Dielectric Anisotropy | 3.9 | 3.8 |
| | Threshold Voltage (V) | 2.02 | 2.01 |
| | Response Time (ms) | 12.3 | 14.2 |

The composition of the present invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, concrete examples of the component compound will be shown. Sixth, the preparation methods of the component compound will be explained. Last, use of the composition will be explained.

First, the constitution of component compounds in the composition will be explained. The composition of the present invention is classified into the composition A and the composition B. The composition A may further contain other compounds. The "other compounds" include a liquid crystal compound, an additive, an impurity, and so forth. This liquid crystal compound is different from the compounds (1) to (6). The homologue of the compound (1) is one of the "other compounds." Such a liquid crystal compound is mixed with the composition for the purpose of adjusting the characteristics of the composition. The additive includes an optically active compound, a coloring matter, an antioxidant, and so forth. The optically active compound is mixed with the composition for the purpose of giving a twist angle by means of inducing a helical structure. The coloring matter is mixed with the composition to suit for the element of a guest host (GH) mode. The antioxidant is mixed with the composition in order to avoid a decrease in specific resistance caused by heating in the air, or to maintain a large voltage holding ratio at room temperature and also at a high temperature even after the element has been used for a long time. The impurity is a compound and so forth contaminated in the process such as the synthesis of a component compound and so forth.

The composition B consists essentially of the compounds selected from the compounds (1) to (4) or from the compounds (1) to (6). The composition B is preferable to the composition A from the viewpoint of costs. The composition A is preferable to the composition B, because characteristics of the composition A can be further adjusted by mixing with other liquid crystal compounds.

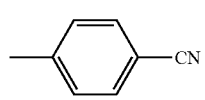 (7-1)

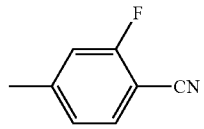 (7-2)

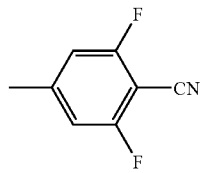 (7-3)

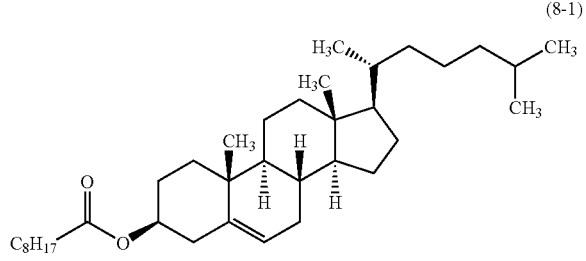 (8-1)

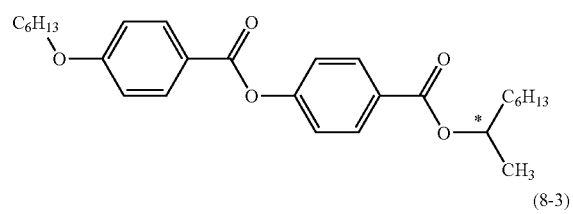 (8-2)

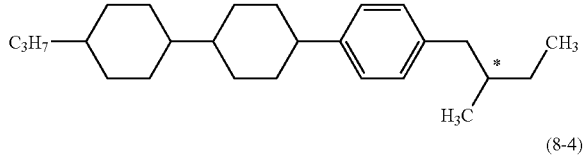 (8-3)

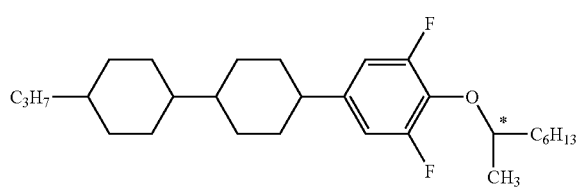 (8-4)

A liquid crystal compound which is different from the compounds (1) to (6) includes the compound having a cyano group. The compound has a partial structure shown by formulas (7-1) to (7-3). Such a liquid crystal compound may be mixed with a composition used for an element having a mode such as IPS and so forth. However, the compound is not proper for the composition used for a TN-TFT element, because it decreases a specific resistance of the composition.

Second, the main characteristics of the component compounds and the main effects of the compounds on the composition will be explained. The main characteristics of the component compounds are summarized in Table 3. In Table 3, the letter L represents large or high, the letter M represents a middle degree and the letter S represents small or low. The numeral 0 (zero) indicates that a dielectric anisotropy is nearly zero (or very small).

TABLE 3

Characeristics of Compound

| | Compound (1) | Compound (2) | Compound (3) | Compound (4) | Compound (5) | Compound (6) |
|---|---|---|---|---|---|---|
| Maximum Temperature | S | S | M | L | L | L |
| Viscosity | S | S | M | S | M | L |
| Optical Anisotropy | S | S | M~L | M | M~L | M |
| Dielectric Anisotropy | S | 0 | M~L | 0, S | 0 | M |
| Specific Resistance | L | L | L | L | L | L |

The specific feature of the composition lies in the combination of the compounds (1) to (4). The compound (1) has a large effect for decreasing a minimum temperature of the composition. The compound (2) has a large effect for decreasing a viscosity of the composition. The compound (3) has a large effect for increasing a dielectric anisotropy of the composition. The compound (4) has a large effect for increasing a maximum temperature of the composition. Dielectric anisotropy of the typical component compounds is summarized in Table 4. Table 4 shows that a low threshold voltage for driving an element depends mainly on the compound (3). The compounds are shown according to the notation in Table 5.

TABLE 4

Dielectric Anisotropy of Compound

| Component | Desirable Compound | Representative Compound | Dielectric Anisotropy |
|---|---|---|---|
| First Component | Compound (1) | 3-HB-CL | 5.0 |
| Second Component | Compound (2) | 3-HH-4 | −0.3 |
| Third Component | Compound (3-1-8) | 3-HHB(F,F)-F | 11.0 |
| | Compound (3-2-7) | 3-HBB(F,F)-F | 11.7 |
| | Compound (3-2-14) | 3-BB(F,F)XB(F,F)-F | 27.7 |
| Fourth Component | Compound (4-1-1) | 3-HHB-1 | 1.7 |
| | Compound (4-2-2) | 5-HHB-CL | 5.0 |
| | Compound (4-2-4) | 5-HHEB-F | 6.3 |
| Fifth Component | Compound (5-1) | 5-HBB(F)B-2 | 3.9 |
| | Compound (5-2) | 101-HBBH-5 | 3.0 |
| | Compound (6-1) | 3-HHBB(F,F)-F | 13.0 |

The main effects of the compounds on the composition will be explained. The compound (1) decreases a maximum temperature, decreases a viscosity, decreases an optical anisotropy, and increases a threshold voltage. The compound (1) prevents the composition to be changed from a nematic phase to a smectic phase (or crystals) at low temperature. The compound (2) decreases a maximum temperature, especially decreases a viscosity, decreases an optical anisotropy, and increases a threshold voltage. The compound (3) increases a maximum temperature, increases a viscosity, increases, increases an optical anisotropy, and especially decreases a threshold voltage. The compound (4) especially increases a maximum temperature, decreases a viscosity, increases an optical anisotropy, and increases a threshold voltage. The compound (3) includes the compounds (3-1) and (3-2). The compound (3-1) increases an optical anisotropy. The compound (3-2) especially increases an optical anisotropy. The compound (4) includes the compounds (4-1) and (4-2). The compound (4-1) especially decreases a viscosity. The compound (4-2) especially decreases a minimum temperature. For further controlling the characteristics of the composition, one or both of the compounds (5) and (6) are mixed. The compound (5) increases especially a maximum temperature and increases an optical anisotropy. The compound (6) especially increases an maximum temperature and decrease a threshold voltage.

Third, a desirable ratio of the component compound and the basis therefor will be explained. The desirable ratio is the same in both compositions A and B. A desirable ratio of the first component is approximately 10% or more for decreasing a minimum temperature and is approximately 35% or less for increasing a maximum temperature. A more desirable ratio is from approximately 10% to approximately 25%. The ratio in this range is suitable for the composition having a higher maximum temperature. A desirable ratio of the second component is approximately 20% or more for decreasing a viscosity and is approximately 40% or less for decreasing a minimum temperature. A more desirable ratio is from approximately 20% to approximately 30% or from approximately 26% to approximately 40%. The former is suitable for the composition having a larger optical anisotropy or the composition having a low threshold voltage. The latter is suitable for the composition having a smaller viscosity. A most desirable ratio is from approximately 26% to approximately 30%. The ratio in this range is suitable for the composition having a smaller viscosity and a low threshold voltage.

A desirable ratio of the third component is approximately 10% or more for decreasing a threshold voltage and is approximately 45% or less for decreasing a minimum temperature. A more desirable ratio is from approximately 10% to 35%. The ratio in this range is suitable for the composition having a lower minimum temperature and a smaller viscosity. A desirable ratio of the fourth component is approximately 10% or more for increasing a maximum temperature and is approximately 55% or less for decreasing a minimum temperature. A more desirable ratio is from approximately 15% to approximately 45%. The ratio in this range is suitable for the composition having a higher maximum temperature and a lower minimum temperature. When the fifth component is mixed, its desirable ratio is approximately 1% or more for further increasing a maximum temperature and approximately 20% or less for further decreasing a minimum temperature. A more desirable ratio is from approximately 1% to approximately 15%. The ratio in this range is suitable for the composition having a lower minimum temperature or a smaller viscosity.

An antioxidant may be mixed with the composition to avoid a decrease in specific resistance caused by heating in the air. The antioxidant is effective in maintaining a large voltage holding ratio of the element at room temperature and also at a high temperature even after it has been used for a long time. When an antioxidant is added to the composition, a desirable ratio is approximately 50 ppm or more for obtaining its effect. A desirable ratio is approximately 600 ppm or less for increasing a maximum temperature or decreasing a minimum temperature of the composition. A more desirable ratio is from approximately 100 ppm to approximately 300 ppm. The ratio (ppm) is based on the total weight of liquid crystal compounds.

In the composition A described above, a desirable total ratio of the first component to the fourth component (or the fifth component) is approximately 70% or more to obtain good characteristics. A more desirable ratio is approximately 90% or more.

Fourth, a desirable embodiment of the component compound will be explained. The symbol $R^1$ was used for many compounds in the chemical formulas for the component compounds. $R^1$ may be identical or different in these compounds. In one case, for example, $R^1$ of the compound (2) is ethyl and $R^1$ of the compound (4) is ethyl. In another case, $R^1$ of the compound (2) is ethyl and $R^1$ of the compound (4) is propyl. This rule is also applicable to the symbols $R^2$, $A^1$, $Z^1$, $Y^1$, m, and so forth. $R^1$ and $R^2$ are independently an alkyl group having 1 to 12 carbons. $R^3$ is an alkyl group having 1 to 12 carbons or an alkenyl group having 2 to 12 carbons. Desirable $R^3$ is an alkyl group from the viewpoint of low cost for the production. $R^4$ is an alkyl group having 1 to 12 carbons or an alkoxy group having 1 to 12 carbons. $R^5$ is an alkyl group having 1 to 12 carbons or an alkoxymethyl group having 2 to 12 carbons. $Y^2$ is an alkyl group having 1 to 12 carbons, an alkoxy group having 1 to 12 carbons, fluorine, chlorine, or —$OCF_3$.

Desirable alkyl groups are methyl, ethyl, propyl, butyl, pentyl, hexyl, heptyl, or octyl. More desirable alkyl groups are ethyl, propyl, butyl, pentyl, or heptyl from the viewpoint of viscosity and so forth.

Desirable alkoxy groups are methoxy, ethoxy, propoxy, butoxy, pentyloxy, hexyloxy, or heptyloxy. More desirable alkoxy groups are methoxy or ethoxy from the viewpoint of viscosity and so forth.

Desirable alkenyl groups are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl groups are vinyl, 1-propenyl, 3-butenyl, or 3-pentenyl from the viewpoint of viscosity and so forth. A desirable configuration of —CH=CH— in these alkenyl groups depends on the position of a double bond. Trans is desirable in alkenyl groups such as 1-propenyl, 1-butenyl, 1-pentenyl, 1-hexenyl, 3-pentenyl, and 3-hexenyl from the viewpoint of viscosity and so forth. Cis is desirable in alkenyl groups such as 2-butenyl, 2-pentenyl and 2-hexenyl.

Desirable alkoxymethyl groups are methoxymethyl, ethoxymethyl, propoxymethyl, butoxymethyl, or pentyloxymethyl. More desirable alkoxymethyl groups are methoxymethyl from the viewpoint of viscosity and so forth. $A^1$ is 1,4-cyclohexylene or 1,4-phenylene. $A^2$ is 1,4-cyclohexylene, 1,4-phenylene or 2,6-difluoro-1,4-phenylene. $A^3$ is 1,4-phenylene or 2,6-difluoro-1,4-phenylene. $A^4$ is 1,4-cyclohexylene, 1,4-phenylene or 2-fluoro-1,4-phenylene. $A^5$ is 1,4-phenylene or 2-fluoro-1,4-phenylene. On the configuration of 1,4-cyclohexylene, trans is preferable to cis from the viewpoint of maximum temperature. Fluorine of 2,6-difluoro-1,4-phenylene is positioned in order to increase a dielectric anisotropy of the compound. See the compound (3-2-5), the compound (3-2-14) and so forth. Fluorine of 2-fluoro-1,4-phenylene may position in either the right side or left side of the ring. A desirable position is the right side like the compound (5-1), the compound (5-4) and so forth. $Z^1$ is a single bond or —$(CH_2)^2$—. Desirable $Z^1$ is a single bond from the viewpoint of viscosity and so forth. $Z^2$ is a single bond, —$(CH_2)_2$—, —COO—, or —$CF_2O$—. Desirable $Z^2$ is a single bond or —$CF_2O$— from the viewpoint of viscosity and so forth. $Z^3$ is a single bond or —COO—. Desirable $Z^3$ is a single bond from the viewpoint of viscosity and so forth. $Z^4$ is a single bond, —COO— or —$CF_2O$—. Desirable $Z^4$ is a single bond from the viewpoint of viscosity and so forth. $Z^5$ is a single bond or —$CF_2O$—. Desirable $Z^5$ is a single bond from the viewpoint of viscosity. Desirable $Z^5$ is —$CF_2O$— from the viewpoint of dielectric anisotropy. A bonding group of —COO— or —$CF_2O$— is positioned so as to make dielectric anisotropy of the compound larger. See the compound (3-1-5), the compound (3-1-7) and so forth.

Fifth, concrete examples of the component compound will be shown. In the desirable compounds described below, $R^1$ and $R^2$ are independently an alkyl group having 1 to 12 carbons, $R^3$ is an alkyl group having 1 to 12 carbons or an alkenyl group having 2 to 12 carbons. $R^6$ is an alkyl group having 1 to 12 carbons. Desirable alkyl or alkenyl groups are as described above. More desirable alkyl or alkenyl groups are as described above. In these desirable compounds, trans is preferable to cis for the configuration of 1,4-cyclohexylene from the viewpoint of maximum temperature.

Desirable combination of $R^1$ and $R^2$ in the compound (2) is ethyl and propyl, ethyl and pentyl, propyl and butyl, propyl and pentyl from the viewpoint of viscosity. Desirable compound (3) is the compound (3-1) and the compound (3-2). Desirable compound (3) is also the compounds (3-1-1) to (3-2-14). More desirable compound (3) is the compound (3-1-8), the compound (3-1-11), the compound (3-1-12), the compound (3-2-7), the compound (3-2-10), the compound (3-2-11), and the compound (3-2-14) from the viewpoint of decreasing a threshold voltage. Especially desirable compound (3) is the compound (3-1-8) and the compound (3-2-7) from the viewpoint of decreasing a viscosity and the compound (3-2-14) from the viewpoint of decreasing a threshold voltage. In the comparison of the compound (3-1-8) and the compound (3-2-7), the compound (3-2-7) is desirable from the viewpoint of increasing an optical anisotropy. Desirable $R^3$ in these compounds is alkyl from the viewpoint of low production cost.

Desirable compound (4) is the compound (4-1). Desirable compound (4) is also the compounds (4-1-1) to (4-2-5). More desirable compound (4) is the compound (4-1-1) and the compound (4-1-2) from the viewpoint of decreasing a viscosity and the compound (4-2-1), the compound (4-2-2), the compound (4-2-4), and the compound (4-2-5) from the viewpoint of decreasing a minimum temperature. Especially desirable compound (4) is the compound (4-1-1) from the viewpoint of decreasing a viscosity, and the compound (4-2-1), the compound (4-2-2) and the compound (4-2-5) from the viewpoint of decreasing a minimum temperature. Desirable compound (5) is the compounds (5-1) to the compound (5-5). More desirable compound (5) is the compound (5-1), the compound (5-4) and the compound (5-5) from the viewpoint of decreasing a minimum temperature. Especially desirable compound (5) is the compound (5-1) from the viewpoint of increasing an optical anisotropy. Desirable compound (6) is the compounds (6-1) and the compound (6-2). More desirable compound (6) is the compound (6-1) from the viewpoint of decreasing a viscosity.

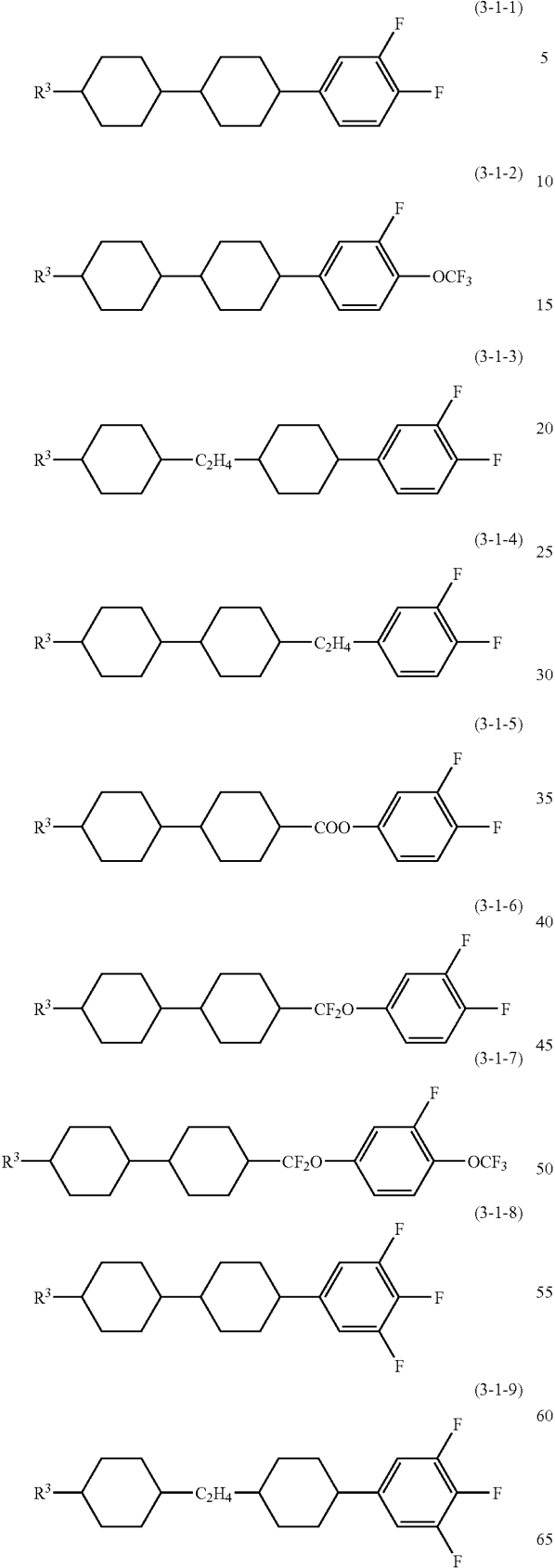
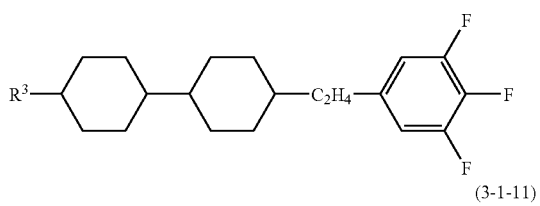
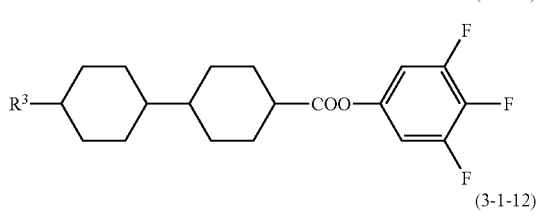
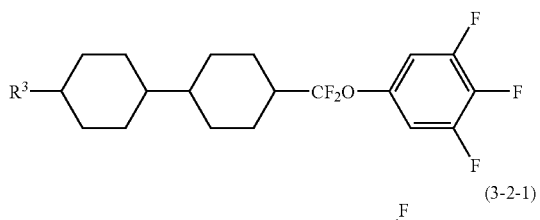
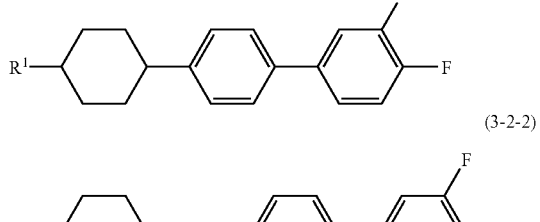
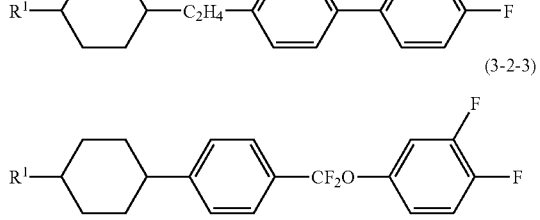
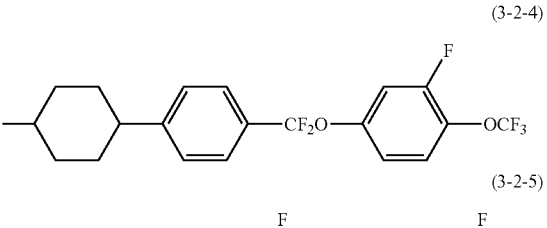
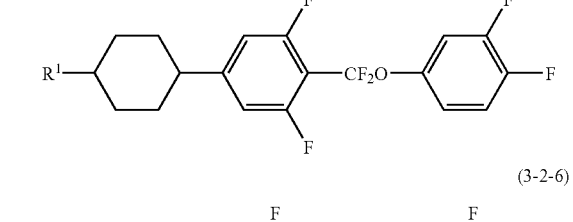
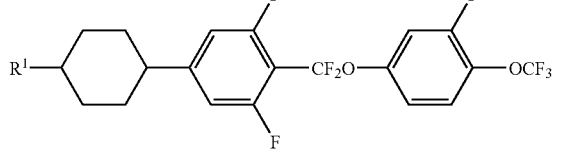

-continued
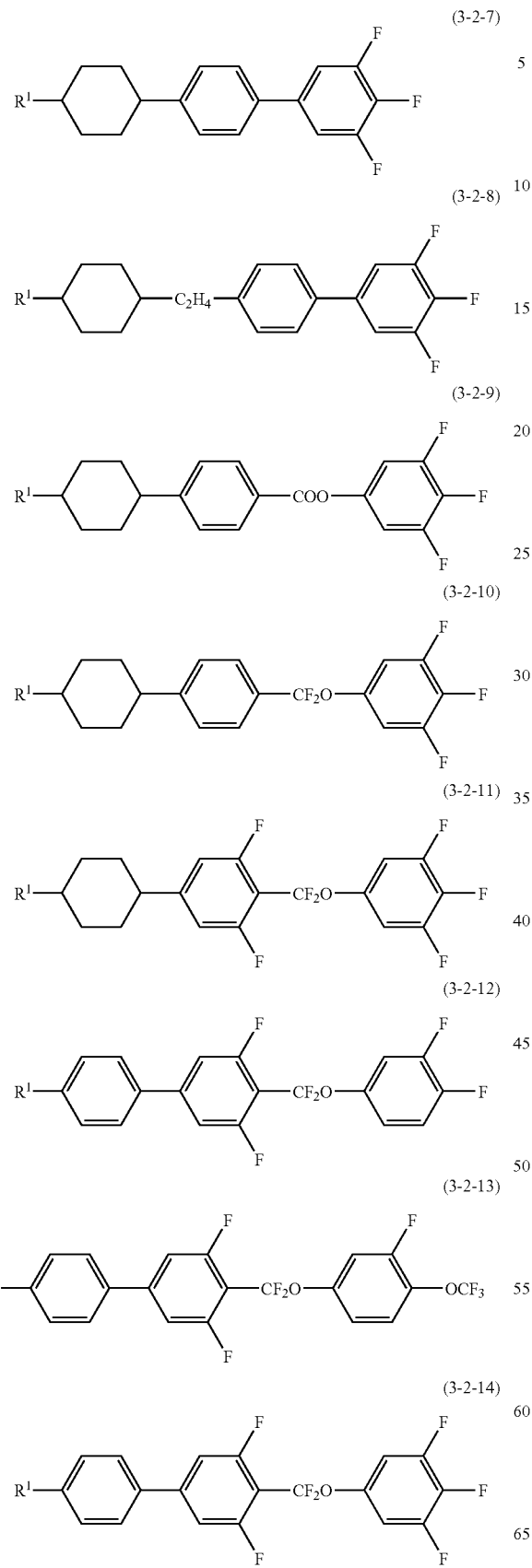
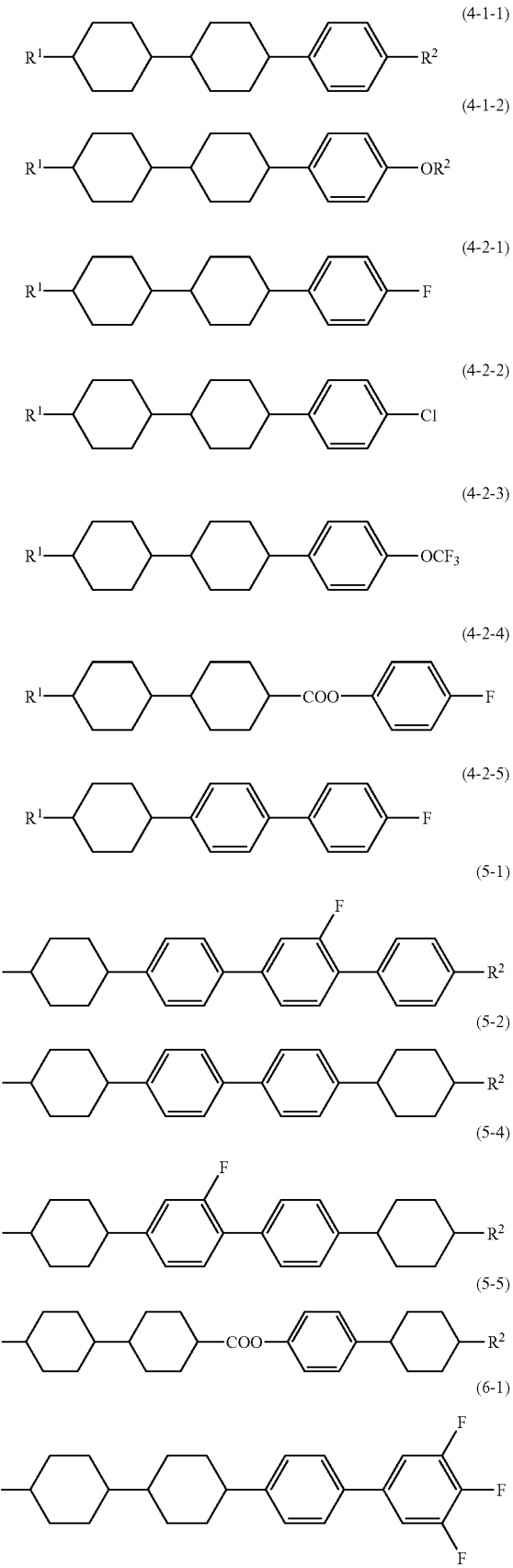

-continued (6-2)

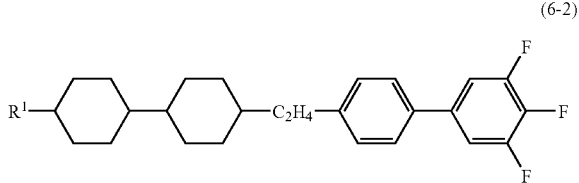

When an antioxidant is added to the composition, desirable one is the compound (9):

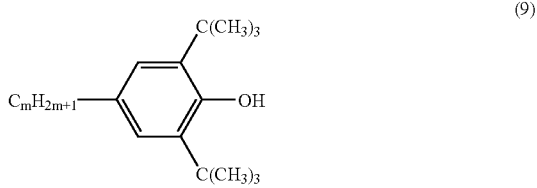

(9)

wherein m is an integer from 1 to 9. Desirable m is 1, 3, 5, 7, or 9. More desirable m is 1 and 7. When m is 1, the compound (9) has a large volatility, and is effective in preventing the decrease of specific resistance caused by heating in the air. When m is 7, the compound (9) has a small volatility, and is effective in maintaining a large voltage holding ratio at room temperature and also at a high temperature even after the element has been used for a long time.

Sixth, the preparation methods of the component compounds will be explained. These compounds can be prepared by known methods. The preparation method will be exemplified below. The compound (1) is prepared by the method disclosed in JP S58-126823 A/1983. The compound (2) is prepared by the method described in JP S59-070624 A/1984. The compound (3-1-8) and the compound (3-2-7) are prepared by the method described in JP H2-233626 A/1990. The compound (4-1-1) is prepared by the method described in JP S57-165328 A/1982.

The compound (4-2-2) is prepared by the method described in JP S57-114531 A/1982. The compound (5-1) is prepared by the method described in JP H2-237949 A/1990. The compound (6-1) is prepared by the method described in JP H2-233626 A/1990.

The compounds for which preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth. The compound (9) wherein m is 1 is commercially available, for example, from Aldrich. The compound (9) wherein m is 7 can be synthesized according to the method described in U.S. Pat. No. 3,660,505. The composition is prepared according to known methods using the compounds thus obtained. For example, the component compounds are mixed and dissolved in each other by heating.

Last, use of the composition will be explained. Most of the compositions have a minimum temperature of approximately −30° C. or less, a maximum temperature of approximately 70° C. or more, and an optical anisotropy of approximately 0.08 to approximately 0.12. The element containing the composition has a large voltage holding ratio. The composition is suitable for an AM element. The composition is suitable especially for an AM element of a transmission type. The composition having an optical anisotropy of approximately 0.07 to approximately 0.18 and further the composition having an optical anisotropy of approximately 0.06 to approximately 0.20 may be prepared by controlling ratios of the component compounds or by mixing other liquid crystal compounds. The composition can be used as a composition having a nematic phase and as an optically active composition by adding an optically active compound.

The composition can be used for an AM element. It can also be used for a PM element. The composition can also be used for an element having a mode such as PC, TN, STN, ECB, OCB, IPS, VA, and so forth. It is desirable to use the composition for an element having a mode of TN, ECB, OCB, or IPS. These elements may be of a reflection type, a transmission type or a semi-transmission type. It is desirable to use the composition for an element of a transmission type. It can be used for an amorphous silicon-TFT element or a polycrystal silicon-TFT element. The composition is also usable for a nematic curvilinear aligned phase (NCAP) element prepared by microcapsulating the composition, and for a polymer dispersed (PD) element in which a three dimensional net-work polymer is formed in the composition, for example, a polymer network (PN) element.

EXAMPLES

The present invention will be explained in detail by way of Examples. The present invention is not limited by the Examples described below. The compounds described in the Comparative Examples and the Examples are expressed by the symbols according to the definition in Table 5. In Table 5, the configuration of 1,4-cyclohexylene is trans. The configuration regarding a bonding group of —CH=CH— is trans. The parenthesized number next to the symbolized compounds in the Examples corresponds to the number of the desirable compound. The symbol (–) means other liquid crystal compound. A ratio (percentage) of a liquid crystal compound is percentage by weight (% by weight) based on the total weight of liquid crystal compounds. Last, the characteristics of the composition are summarized.

TABLE 5

| Method for Description of Compound Using Symbols R—(A$_1$)—Z$_1$—...—Z$_n$—(A$_n$)—X | |
|---|---|
| 1) Left Terminal Group R— | Symbol |
| C$_n$H$_{2n+1}$— | n— |
| C$_n$H$_{2n+1}$O— | nO— |
| C$_m$H$_{2m+1}$OC$_n$H$_{2n}$— | mOn— |
| CH$_2$=CH— | V— |
| 2) Rin Structure —A$_n$— | Symbol |
|  | H |
| 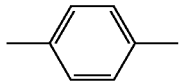 | B |
| 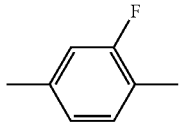 | B(F) |

TABLE 5-continued

Method for Description of Compound Usin Symbols
R—(A₁)—Z₁—. . .—Zₙ—(Aₙ)—X

| | |
|---|---|
| 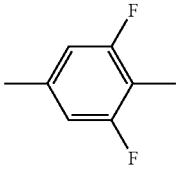 | B(F, F) |

| 3) Bondin Group —Zₙ— | Symbol |
|---|---|
| —C₄H₈— | 4 |
| —C₂H₄— | 2 |
| —COO— | E |
| —CH=CH— | V |
| —C≡C— | T |
| —CF₂O— | X |

| 4) Ri ht Terminal Group —X | Symbol |
|---|---|
| —CₙH₂ₙ₊₁ | -n |
| —OCₙH₂ₙ₊₁ | —On |
| —F | —F |
| —Cl | —CL |
| —COOH | —COOH |
| —OCF₃ | —OCF3 |
| —OCF₂CFHCF₃ | —OCF2CFHCF3 |

5) Example of Description

Example 1. 3-HB-CL

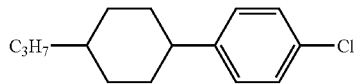

Example 2. 3-HH-4

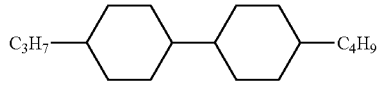

Example 3. 3-BB(F, F)XB(F, F)-F

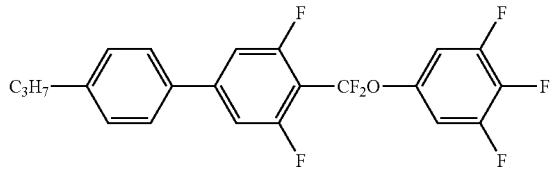

Eexample 4. 5-HBB(F)B-2

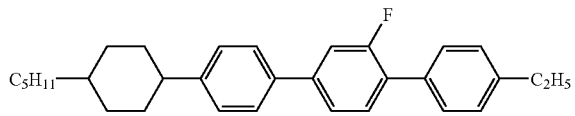

The composition is prepared by first measuring components such as a liquid crystal compound and then by mixing them. Thus, it is easy to calculate the percentage by weight of the component. However, it is not easy to calculate exactly the ratios of the components by analyzing the composition with gas chromatography. It is because the correction coefficient depends on the kind of a liquid crystal compound. Fortunately, the correction coefficient is approximately 1. Furthermore, the difference of 1% by weight only slightly influences on characteristics of the composition. Therefore, the peak area ratio of the component peaks in the gas chromatograph can be regarded as a percentage by weight of the component compound. Namely, the results of gas chromatographic analysis (peak area ratio) is considered to be equivalent to the percentage by weight of a liquid crystal compound without correction.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement; (Extrapolated value)=(value measured−0.85×value measured for mother liquid crystals)/0.15. When a smectic phase (or crystals) separated out at this ratio at 25° C., a ratio of the compound and mother liquid crystals was changed step by step in the order of (10% by weight: 90% by weight), (5% by weight: 95% by weight), (1% by weight: 99% by weight), respectively. Values for a maximum temperature, optical anisotropy, viscosity, and dielectric anisotropy of the compound were obtained by the extrapolation.

The composition of the mother liquid crystals is as shown below.

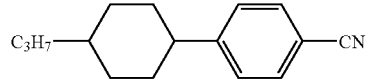

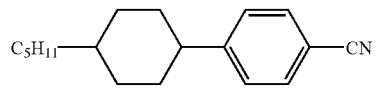

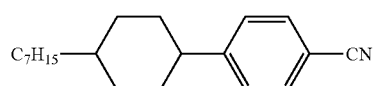

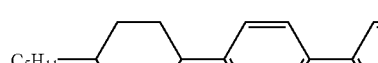

Measurement of the characteristics was carried out according to the following methods. Most of them are described in the Standard of Electric Industries Association of Japan, EIAJ ED-2521 A or those with some modifications. A TFT was not attached to a TN element used for measurement.

A maximum temperature of a nematic phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

A minimum temperature of a nematic phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; mPa·s, measured at 20° C.): A viscosity was measured by means of an E-type viscometer.

Optical anisotropy (Δn; measured at 25° C.): Measurement was carried out with an Abbe refractometer mounting a polarizing plate on an ocular using a light at a wavelength of 589 nanometers. The surface of a main prism was rubbed in one direction, and then a sample was dropped on the main prism. Refractive index n∥ was measured when the direction of a polarized light was parallel to that of the rubbing. Refractive index n⊥ was measured when the direction of a polarized light was perpendicular to that of the rubbing. A value of optical anisotropy was calculated from the equation; Δn=n∥−n⊥.

Dielectric anisotropy (Δ∈; measured at 25° C.): A sample was poured into a TN element in which the cell gap between two glass plates was 9 micrometers and a twist angle was 80 degrees. Sine waves (10 volts, 1 kilohertz) were impressed onto the element, and a dielectric constant (∈∥) that is parallel to a liquid crystal molecule was measured after 2 seconds. Sine waves (0.5 volts, 1 kilohertz) were impressed onto the element, and a dielectric constant (∈⊥) that is perpendicular to a liquid crystal molecule was measured after 2 seconds. A value of a dielectric anisotropy was calculated from the equation;

Δ∈=∈∥−∈⊥.

Threshold voltage (Vth; measured at 25° C.; V): Measurement was carried out with LCD Evaluation System Model LCD-5100 made by Otsuka Electronics Co., Ltd. Light source is a halogen lamp. A sample was poured into a TN element of a normally white mode, in which a cell gap between two glass plates was 5.0 micrometers and a twist angle was 80 degrees. Voltage to be impressed onto the element (32 Hz, rectangular waves) was stepwise increased by 0.02 volt starting from zero volt up to 10 volts. During the stepwise increasing, a light was irradiated to the element in a perpendicular direction, and an amount of the light passing through the element was measured. Voltage-transmission curve was prepared, in which a maximum amount of a light corresponded to 100% transmittance, a minimum amount of a light corresponded to 0% transmittance. Threshold voltage is a value at 90% transmittance.

Voltage holding ratio (VHR; measured at 25° C. and 100° C.; %): A TN element used for measurement has a polyimide-alignment film and the cell gap between two glass plates is 6 micrometers. A sample was poured into the element, and then the element was sealed by an adhesive which polymerized by the irradiation of ultraviolet light. The TN element was impressed and charged with pulse voltage (60 microseconds at 5 volts). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B. A voltage holding ratio obtained at 25° C. was expressed as VHR-1. A voltage holding ratio obtained at 100° C. was expressed as VHR-2. Next, this TN element was heated at 100° C. for 250 hours. VHR-3 is a voltage holding ratio measured at 25° C. after heating. VHR-4 is a voltage holding ratio measured at 100° C. after heating. VHR-1 and VHR-2 correspond to evaluation of an element at the initial stage. VHR-3 and VHR-4 correspond to evaluation of an element after it has been used for a long time.

Response time (τ; measured at 25° C.; millisecond): Measurement was carried out with LCD Evaluation System Model LCD-5100 made by Otsuka Electronics Co., Ltd. Light source is a halogen lamp. Low-pass filter was set at 5 kilohertz. A sample was poured into a TN element of a normally white mode, in which a cell gap between two glass plates was 5.0 micrometers and a twist angle was 80 degrees. Rectangle waves (60 Hertz, 5 volts, 0.5 seconds) was impressed to the element. During impressing, a light was irradiated to the element in a perpendicular direction, and an amount of the light passing through the element was measured. A maximum amount of a light corresponds to 100% transmittance, and a minimum amount of a light corresponds to 0% transmission. Rise time (τr) is a period of time required for the change in transmittance from 90% to 10%. Fall time (τf) is a period of time required for the change in transmittance from 10% to 90%. Response time is a sum of rise time and fall time thus obtained.

Gas chromatographic Analysis: Gas Chromatograph Model GC-14B made by Shimadzu was used for measurement. Carrier gas is helium (2 milliliters per minute). An evaporator and a detector (FID) were set up at 280° C. and 300° C., respectively. Capillary column DB-1 (length 30 meters, bore 0.32 millimeters, film thickness 0.25 micrometers; fixed liquid phase is dimethylpolysiloxane; non-polar) made by Agilent Technologies Inc. was used for the separation of the component compound. After the column had been kept at 200° C. for 2 minutes, it was further heated to 280° C. at the rate of 5° C. per minute. A sample was prepared into an acetone solution (0.1% by weight), and 1 microliter of the solution was injected into the evaporator. The recorder used was Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). An area ratio of each peak in the gas chromatogram corresponds to a ratio of the component compound. Percentage by weight of the component compound is not completely identical to an area ratio of each peak. According to the present invention, however, percentage by weight of the component compound may be regarded to be identical to an area ratio of each peak, when these capillary columns are used. This is because there is no significant difference in correction efficient of component compounds.

Comparative Example 1

Example 17 was chosen from the compositions disclosed in JP H8-239665 A/1996. The basis is that the composition contains the compound (1) and the compound (2) of the present invention, and has the smallest viscosity. The components and characteristics of the composition are as follows. The composition has a high minimum temperature, a large viscosity and a long response time.

| | |
|---|---|
| 5-H4HB(F,F)-F | 5% |
| 5-H2B(F)-F | 10% |
| 2-HHB(F)-F | 3.3% |
| 3-HHB(F)-F | 3.3% |
| 5-HHB(F)-F | 3.4% |
| 2-HBB(F)-F | 1.2% |
| 3-HBB(F)-F | 1.2% |
| 5-HBB(F)-F | 2.6% |
| 5-HH2B(F,F)-F | 5% |

-continued

| | |
|---|---|
| 3-HBB(F,F)-F | 5% |
| 5-HBB(F,F)-F | 5% |
| 3-HBEB(F,F)-F | 10% |
| 3-HHEB(F,F)-F | 10% |
| 5-HHEB(F,F)-F | 5% |
| 3-HH2BB(F,F)-F | 10% |
| 3-HB-CL | 5% |
| 5-HHB-CL | 5% |
| 3-HH-5 | 5% |
| 3-HB(F)VB-4 | 5% |

NI=94.4° C.; Tc≦−10° C.; Δ=0.103; η=22.9 mPa·s; Vth=1.82 V; VHR-1=98.9%; VHR-2=97.3%; τ=32.2 ms.

Comparative Example 2

Example 5 was chosen from the compositions disclosed in JP H9-071779 A/1997. The basis is that the composition has the smallest viscosity. The components and characteristics of the composition are as follows. The composition has a large viscosity, a high threshold voltage and a long response time.

| | |
|---|---|
| 5-HB-CL | 8% |
| 7-HB-CL | 5% |
| 3-HHEB(F,F)-F | 6% |
| 2-HBEB(F,F)-F | 2% |
| 3-HBEB(F,F)-F | 2% |
| 3-HH-4 | 11% |
| 3-HH-5 | 4% |
| 3-HHB-1 | 8% |
| 3-HHB-F | 4% |
| 2-HHB(F)-F | 10% |
| 3-HHB(F)-F | 11% |
| 5-HHB(F)-F | 11% |
| 2-HBB(F)-F | 4% |
| 3-HBB(F)-F | 5% |
| 5-HBB(F)-F | 9% |

NI=91.1° C.; Tc≦−40° C.; Δn=0.088; η=17.6 mPa·s; Vth=2.08 V; VHR-1=99.4%; VHR-2=97.5%; τ=21.3 ms.

Comparative Example 3

Example 14 was chosen from the compositions disclosed in JP H9-087626 A/1997. The basis is that the composition contains the compound (1) and the compound (2) of the present invention. The components and characteristics of the composition are as follows. The composition has a high minimum temperature, a large viscosity, a small voltage holding ratio (VHR-2) and a long response time.

| | |
|---|---|
| 5-B-COOH | 12% |
| 3-HB-COOH | 3% |
| 5-H2B(F)-F | 10% |
| 2-HHB(F)-F | 3.3% |
| 3-HHB(F)-F | 3.3% |
| 5-HHB(F)-F | 3.4% |
| 2-HBB(F)-F | 1.25% |
| 3-HBB(F)-F | 1.25% |
| 5-HBB(F)-F | 2.5% |
| 5-HH2B(F,F)-F | 5% |
| 3-HBB(F,F)-F | 5% |
| 5-HBB(F,F)-F | 5% |
| 3-HBEB(F,F)-F | 10% |
| 3-HHEB(F,F)-F | 5% |
| 5-HHEB(F,F)-F | 5% |

-continued

| | |
|---|---|
| 3-HH2BB(F,F)-F | 5% |
| 3-HB-CL | 5% |
| 5-HHB-CL | 5% |
| 3-HB(F)VB-4 | 5% |
| 3-HH-5 | 5% |

NI=104.5° C.; Tc≦−10° C.; Δn=0.115; η=34.7 mPa·s; Vth=2.00 V; VHR-1=98.2%; VHR-2=93.5%; τ=43.7 ms.

Comparative Example 4

Example 15 was chosen from the compositions disclosed in JP H9-87627 A/1997. The basis is that the composition contains the compound (1) and the compound (2) of the present invention. The components and characteristics of the composition are as follows. The composition has a high minimum temperature, a large viscosity, a high threshold voltage, a small voltage holding ratio (VHR-2) and a long response time.

| | |
|---|---|
| 5-HH-COOH | 9% |
| 2-HB(F)-COOH | 11% |
| 7-HB(F,F)-F | 10% |
| 2-HH2B(F,F)-F | 7% |
| 3-HH2B(F,F)-F | 10% |
| 5-H2HB-OCF3 | 5% |
| 2-HBB(F,F)-F | 8% |
| 5-H2BB(F,F)-F | 3% |
| 7-HB-F | 10% |
| 3-HB-CL | 8% |
| 3-HH-4 | 10% |
| 3-HHB-3 | 2% |
| 3-H2BTB-3 | 2% |
| 3-H2BTB-4 | 2% |
| 3-HHEBB-F | 3% |

NI=105.9° C.; Tc≦−20° C.; Δn=0.089; η=32.5 mPa·s; Vth=2.40 V; VHR-1=98.8%; VHR-2=92.9%; τ=34.1 ms.

Comparative Example 5

Example 5 was chosen from the compositions disclosed in JP H9-87628 A/1997. The basis is that the composition contains the compound (1) and the compound (2) of the present invention. The components and characteristics of the composition are as follows. The composition has a high minimum temperature, a large viscosity, a high threshold voltage, a small voltage holding ratio (VHR-2), and a long response time.

| | |
|---|---|
| 7-HB(F)-F | 2% |
| 5-H2B(F)-F | 4% |
| 3-HHB-F | 10% |
| 3-HHB-CL | 2% |
| 3-HH2B(F)-F | 2% |
| 5-H2HB(F)-CL | 2% |
| 3-HBB-F | 2% |
| 3-HB-CL | 2% |
| 4-H2BB(F)-F | 2% |
| 5O-B-COOH | 2% |
| 4-B-COOH | 4% |
| 5-B-COOH | 4% |
| 3-HH-4 | 2% |
| 1O1-HH-5 | 2% |
| 3-HB(F)VB-2 | 2% |

-continued

| | | |
|---|---|---|
| 3-HB(F)TB-2 | | 2% |
| 1O1-HBBH-3 | | 2% |
| 2-HHB(F)-F | | 8.632% |
| 3-HHB(F)-F | | 8.684% |
| 5-HHB(F)-F | | 8.684% |
| 2-H2HB(F)-F | | 5.2% |
| 3-H2HB(F)-F | | 2.6% |
| 5-H2HB(F)-F | | 5.2% |
| 2-HBB(F)-F | | 3.25% |
| 3-HBB(F)-F | | 3.25% |
| 5-HBB(F)-F | | 6.5% |

NI=108.0° C.; Tc≦−10° C.; Δn=0.104; η=22.9 mPa·s; Vth=2.27 V; VHR-1=98.4%; VHR-2=93.1%; τ=25.4 ms.

Comparative Example 6

Example 24 was is chosen from the compositions disclosed in JP H9-176645 A/1997. The basis is that the composition contains the compound (1) and the compound (2) of the present invention. The components and characteristics of the composition are as follows. The composition has a high minimum temperature, a large viscosity and a long response time.

| | |
|---|---|
| 5-H4HB-OCF3 | 5% |
| 4-H2BB(F)-F | 5% |
| 5-H2BB(F)-F | 5% |
| 3-HHB-OCF3 | 5% |
| 3-HBB(F,F)-OCF2CFHCF3 | 5% |
| 3-HBB-OCF2CFHCF3 | 5% |
| 3-HBB(F,F)-F | 10% |
| 5-HBB(F,F)-F | 10% |
| 3-HBEB-F | 15% |
| 3-HBEB(F,F)-F | 10% |
| 3-HB-CL | 10% |
| 3-HHB-CL | 5% |
| 3-HH2BB(F,F)-F | 5% |
| 3-HH-4 | 5% |

NI=99.1° C.; Tc≦−10° C.; Δn=0.119; η=28.2 mPa·s; Vth=1.73 V; VHR-1=98.8%; VHR-2=97.1%; τ=41.0 ms.

Example 1

| | | |
|---|---|---|
| 3-HB-CL | (1) | 16% |
| 2-HH-5 | (2) | 5% |
| 3-HH-4 | (2) | 17% |
| 3-HH-5 | (2) | 5% |
| 3-HBB(F,F)-F | (3-2-7) | 29% |
| 3-HHB-3 | (4-1-1) | 9% |
| 2-HHB-CL | (4-2-2) | 5% |
| 3-HHB-CL | (4-2-2) | 7% |
| 5-HHB-CL | (4-2-2) | 7% |

NI=80.4° C.; Tc≦−30° C.; Δn=0.093; η=14.3 mPa·s; Vth=1.98 V; VHR-1=99.5%; VHR-2=97.8%; τ=12.4 ms.

Example 2

| | | |
|---|---|---|
| 3-HB-CL | (1) | 15% |
| 3-HH-4 | (2) | 20% |

-continued

| | | |
|---|---|---|
| 3-HH-5 | (2) | 6% |
| 3-BB(F,F)XB(F,F)-F | (3-2-14) | 18% |
| 3-HHB-1 | (4-1-1) | 4% |
| 3-HHB-O1 | (4-1-2) | 5% |
| 3-HHB-F | (4-2-1) | 3% |
| 2-HHB-CL | (4-2-2) | 5% |
| 3-HHB-CL | (4-2-2) | 6% |
| 5-HHB-CL | (4-2-2) | 4% |
| 2-HBB-F | (4-2-5) | 5% |
| 3-HBB-F | (4-2-5) | 5% |
| 5-HBB-F | (4-2-5) | 4% |

NI=78.6° C.; Tc≦−30° C.; Δn=0.097; η=14.2 mPa·s; Vth=1.77 V; VHR-1=99.3%; VHR-2=97.5%; τ=13.8 ms.

Example 3

| | | |
|---|---|---|
| 3-HB-CL | (1) | 20% |
| 3-HH-4 | (2) | 17% |
| 3-HH-5 | (2) | 7% |
| 3-HHB(F,F)-F | (3-1-8) | 5% |
| 3-HBB(F,F)-F | (3-2-7) | 10% |
| 3-BB(F,F)XB(F,F)-F | (3-2-14) | 10% |
| 3-HHB-1 | (4-1-1) | 7% |
| 3-HHB-F | (4-2-1) | 4% |
| 3-HHB-CL | (4-2-2) | 6% |
| 5-HHB-CL | (4-2-2) | 6% |
| 2-HHBB(F,F)-F | (6-1) | 4% |
| 3-HHBB(F,F)-F | (6-1) | 4% |

NI=79.9° C.; Tc≦−30° C.; Δn=0.093; η=14.6 mPa·s; Vth=1.76 V; VHR-1=99.5%; VHR-2=97.7%; τ=14.3 ms.

Example 4

| | | |
|---|---|---|
| 3-HB-CL | (1) | 14% |
| 2-HH-5 | (2) | 3% |
| 3-HH-4 | (2) | 16% |
| 3-HH-5 | (2) | 5% |
| 3-HBB(F,F)-F | (3-2-7) | 15% |
| 3-BB(F,F)XB(F,F)-F | (3-2-14) | 18% |
| 3-HHB-3 | (4-1-1) | 4% |
| 3-HHB-F | (4-2-1) | 4% |
| 3-HHB-CL | (4-2-2) | 5% |
| 2-HBB-F | (4-2-5) | 2% |
| 3-HBB-F | (4-2-5) | 2% |
| 5-HBB(F)B-2 | (5-1) | 6% |
| 5-HBB(F)B-3 | (5-1) | 6% |

NI=80.4° C.; Tc≦−30° C.; Δn=0.113; η=15.2 mPa·s; Vth=1.77 V; VHR-1=99.2%; VHR-2=97.5%; τ=14.8 ms.

Example 5

| | | |
|---|---|---|
| 3-HB-CL | (1) | 19% |
| 2-HH-5 | (2) | 3% |
| 3-HH-4 | (2) | 20% |
| 3-HH-5 | (2) | 5% |
| 3-BB(F,F)XB(F,F)-F | (3-2-14) | 13% |
| 3-HHB-3 | (4-1-1) | 2% |
| 3-HHB-O1 | (4-1-2) | 3% |

-continued

| | | |
|---|---|---|
| 2-HHB-CL | (4-2-2) | 6% |
| 3-HHB-CL | (4-2-2) | 7% |
| 5-HHB-CL | (4-2-2) | 7% |
| 2-HBB-F | (4-2-5) | 4% |
| 3-HBB-F | (4-2-5) | 4% |
| 5-HBB-F | (4-2-5) | 4% |
| 3-HHBB(F,F)-F | (6-1) | 3% |

NI=80.1° C.; Tc≦−30° C.; Δn=0.095; η=14.4 mPa·s; Vth=1.94 V; VHR-1=99.3%; VHR-2=97.6%; τ=12.8 ms.

Example 6

| | | |
|---|---|---|
| 3-HB-CL | (1) | 21% |
| 2-HH-5 | (2) | 3% |
| 3-HH-4 | (2) | 16% |
| 3-HH-5 | (2) | 5% |
| 3-HBB(F,F)-F | (3-2-7) | 6% |
| 3-BB(F,F)XB(F,F)-F | (3-2-14) | 12% |
| 3-HHB-1 | (4-1-1) | 4% |
| 3-HHB-3 | (4-1-1) | 4% |
| 3-HHB-CL | (4-2-2) | 5% |
| 5-HHB-CL | (4-2-2) | 5% |
| 2-HBB-F | (4-2-5) | 3% |
| 3-HBB-F | (4-2-5) | 4% |
| 5-HBB(F)B-2 | (5-1) | 2% |
| 2-HHBB(F,F)-F | (6-1) | 4% |
| 3-HHBB(F,F)-F | (6-1) | 3% |
| 4-HHBB(F,F)-F | (6-1) | 3% |

NI=81.0° C.; Tc≦−30° C.; Δn=0.100; η=14.9 mPa·s; Vth=1.90 V; VHR-1=99.4%; VHR-2=97.8%; τ=13.5 ms.

Example 7

| | | |
|---|---|---|
| 3-HB-CL | (1) | 14% |
| 2-HH-5 | (2) | 3% |
| 3-HH-4 | (2) | 16% |
| 3-HH-5 | (2) | 5% |
| 3-HBB(F,F)-F | (3-2-7) | 15% |
| 3-BB(F,F)XB(F,F)-F | (3-2-14) | 18% |
| 3-HHB-3 | (4-1-1) | 4% |
| 3-HHB-F | (4-2-1) | 4% |
| 3-HHB-CL | (4-2-2) | 5% |
| 2-HBB-F | (4-2-5) | 2% |
| 3-HBB-F | (4-2-5) | 2% |
| 1O1-HBBH-5 | (5-3) | 3% |
| 5-HB(F)BH-3 | (5-4) | 3% |
| 3-HHEBH-3 | (5-5) | 3% |
| 3-HHEBH-4 | (5-5) | 3% |

NI=80.1° C.; Tc≦−30° C.; Δn=0.101; η=14.8 mPa·s; Vth=1.75 V; VHR-1=99.3%; VHR-2=97.5%; τ=14.6 ms.

Example 8

| | | |
|---|---|---|
| 3-HB-CL | (1) | 20% |
| 3-HH-4 | (2) | 17% |
| 3-HH-5 | (2) | 7% |
| 3-HHXB(F)-OCF3 | (3-1-7) | 3% |
| 3-HHXB(F,F)-F | (3-1-12) | 2% |

-continued

| | | |
|---|---|---|
| 3-HBB(F,F)-F | (3-2-7) | 10% |
| 3-BB(F,F)XB(F)-OCF3 | (3-2-13) | 2% |
| 3-BB(F,F)XB(F,F)-F | (3-2-14) | 8% |
| 3-HHB-1 | (4-1-1) | 7% |
| 3-HHB-F | (4-2-1) | 4% |
| 3-HHB-CL | (4-2-2) | 6% |
| 5-HHB-CL | (4-2-2) | 6% |
| 2-HHBB(F,F)-F | (6-1) | 4% |
| 3-HHBB(F,F)-F | (6-1) | 2% |
| 3-HH2BB(F,F)-F | (6-2) | 2% |

NI=80.3° C.; Tc≦−30° C.; Δn=0.094; η=14.9 mPa·s; Vth=1.74 V; VHR-1=99.2%; VHR-2=97.4%; τ=14.8 ms.

Example 9

| | | |
|---|---|---|
| 3-HB-CL | (1) | 20% |
| 3-HH-4 | (2) | 17% |
| 3-HH-5 | (2) | 7% |
| 3-HHB(F,F)-F | (3-1-8) | 2% |
| 3-HHEB(F,F)-F | (3-1-11) | 3% |
| 3-HBB(F,F)-F | (3-2-7) | 10% |
| 3-BB(F,F)XB(F,F)-F | (3-2-14) | 10% |
| 3-HHB-1 | (4-1-1) | 7% |
| 3-HHB-F | (4-2-1) | 2% |
| 3-HHB-CL | (4-2-2) | 6% |
| 5-HHB-CL | (4-2-2) | 6% |
| 3-HHB-OCF3 | (4-2-3) | 2% |
| 2-HHBB(F,F)-F | (6-1) | 4% |
| 3-HHBB(F,F)-F | (6-1) | 4% |

NI=80.3° C.; Tc≦−30° C.; Δn=0.093; η=14.9 mPa·s; Vth=1.73 V; VHR-1=99.5%; VHR-2=97.5%; τ=14.8 ms.

Example 10

| | | |
|---|---|---|
| 3-HB-CL | (1) | 20% |
| 3-HH-4 | (2) | 17% |
| 3-HH-5 | (2) | 7% |
| V-HHB(F,F)-F | (3-1-8) | 2% |
| 3-H2HB(F,F)-F | (3-1-9) | 2% |
| 3-HH2B(F,F)-F | (3-1-10) | 1% |
| 3-HBB(F,F)-F | (3-2-7) | 10% |
| 3-BB(F,F)XB(F,F)-F | (3-2-14) | 10% |
| 3-HHB-1 | (4-1-1) | 7% |
| 3-HHB-F | (4-2-1) | 4% |
| 3-HHB-CL | (4-2-2) | 6% |
| 5-HHB-CL | (4-2-2) | 6% |
| 2-HHBB(F,F)-F | (6-1) | 4% |
| 3-HHBB(F,F)-F | (6-1) | 4% |

NI=81.2° C.; Tc≦−30° C.; Δn=0.093; η=15.0 mPa·s; Vth=1.80 V; VHR-1=99.4%; VHR-2=97.6%; τ=14.4 ms.

Example 11

| | | |
|---|---|---|
| 3-HB-CL | (1) | 16% |
| 2-HH-5 | (2) | 4% |
| 3-HH-4 | (2) | 17% |
| 3-HH-5 | (2) | 5% |
| 3-HBB(F,F)-F | (3-2-7) | 29% |

-continued

| | | |
|---|---|---|
| 3-HHB-3 | (4-1-1) | 7% |
| 2-HHB-CL | (4-2-2) | 5% |
| 3-HHB-CL | (4-2-2) | 7% |
| 5-HHB-CL | (4-2-2) | 7% |
| 3-HHEB-F | (4-2-4) | 2% |
| 5-HH-O1 | (—) | 1% |

NI=80.1° C.; Tc≦−30° C.; Δn=0.092; η=15.2 mPa·s; Vth=1.99 V; VHR-1=99.4%; VHR-2=97.7%; τ=13.2 ms.

Example 12

| | | |
|---|---|---|
| 3-HB-CL | (1) | 19% |
| 2-HH-5 | (2) | 3% |
| 3-HH-4 | (2) | 20% |
| 3-HH-5 | (2) | 3% |
| 3-BB(F,F)XB(F,F)-F | (3-2-14) | 13% |
| 3-HHB-3 | (4-1-1) | 2% |
| 3-HHB-O1 | (4-1-2) | 3% |
| 2-HHB-CL | (4-2-2) | 6% |
| 3-HHB-CL | (4-2-2) | 7% |
| 5-HHB-CL | (4-2-2) | 7% |
| 2-HBB-F | (4-2-5) | 4% |
| 3-HBB-F | (4-2-5) | 4% |
| 5-HBB-F | (4-2-5) | 4% |
| 3-HHBB(F,F)-F | (6-1) | 3% |
| 5-HH-O1 | (—) | 2% |

NI=79.7° C.; Tc≦−30° C.; Δn=0.095; η=14.9 mPa·s; Vth=1.96 V; VHR-1=99.3%; VHR-2=97.4%; τ=13.1 ms.

Example 13

| | | |
|---|---|---|
| 3-HB-CL | (1) | 16% |
| 2-HH-5 | (2) | 5% |
| 3-HH-4 | (2) | 17% |
| 3-HH-5 | (2) | 5% |
| 3-HBB(F,F)-F | (3-2-7) | 29% |
| 3-HHB-3 | (4-1-1) | 9% |
| 2-HHB-CL | (4-2-2) | 5% |
| 3-HHB-CL | (4-2-2) | 7% |
| 5-HHB-CL | (4-2-2) | 7% |

The compound represented by formula (9) in which m is 1 (300 ppm) was added to the composition above. Characteristics of the composition formed was as follows: NI=80.4° C.; Tc≦−30° C.; Δn=0.093; η=14.3 mPa·s; Vth=1.98 V; VHR-1=99.5%; VHR-2=97.8%; τ=12.4 ms.

Example 14

| | | |
|---|---|---|
| 3-HB-CL | (1) | 15% |
| 3-HH-4 | (2) | 20% |
| 3-HH-5 | (2) | 6% |
| 3-BB(F,F)XB(F,F)-F | (3-2-14) | 18% |
| 3-HHB-1 | (4-1-1) | 4% |
| 3-HHB-O1 | (4-1-2) | 5% |
| 3-HHB-F | (4-2-1) | 3% |
| 2-HBB-Cl | (4-2-2) | 5% |
| 3-HBB-Cl | (4-2-2) | 6% |

-continued

| | | |
|---|---|---|
| 5-HBB-Cl | (4-2-2) | 4% |
| 2-HBB-F | (4-2-5) | 5% |
| 3-HBB-F | (4-2-5) | 5% |
| 5-HBB-F | (4-2-5) | 4% |

The compound represented by formula (9) in which m is 7 (200 ppm) was added to the composition above. Characteristics of the composition formed was as follows: NI=78.6° C.; Tc≦−30° C.; Δn=0.097; η=14.2 mPa·s; Vth=1.77 V; VHR-1=99.3%; VHR-2=97.5%; τ=13.8 ms.

What is claimed is:

1. A liquid crystal composition consisting essentially of:
   (a) a liquid crystal component consisting essentially of a first component that is at least one compound represented by formula (1) in the range of approximately 10% to approximately 35% by weight, a second component that is at least one compound represented by formula (2) in the range from approximately 26% to approximately 40% by weight, a third component that is at least one compound represented by formula (3) in the range from approximately 10% to approximately 45% by weight, and a fourth component that is at least one compound represented by formula (4) in the range from approximately 10% to approximately 55% by weight:

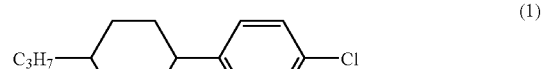

(1)

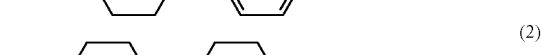

(2)

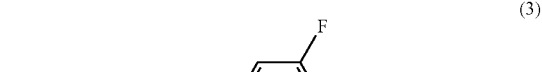

(3)

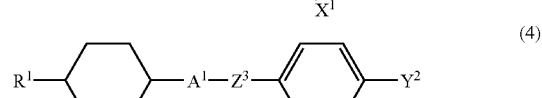

(4)

wherein $R^1$ and $R^2$ are independently an alkyl group having 1 to 12 carbons; $R^3$ is an alkyl group having 1 to 12 carbons or an alkenyl group having 2 to 12 carbons; $Y^1$ is fluorine or —$OCF_3$; $Y^2$ is an alkyl group having 1 to 12 carbons, an alkoxy group having 1 to 12 carbons, fluorine, chlorine, or —$OCF_3$; $X^1$ is hydrogen or fluorine; $A^1$ is 1,4-cyclohexylene or 1,4-phenylene; $A^2$ is 1,4-cyclohexylene, 1,4-phenylene or 2,6-difluoro-1,4-phenylene; $Z^1$ is a single bond or —($CH_2$)$_2$—; $Z^2$ is a single bond, —($CH_2$)$_2$—, —COO—, or —$CF_2O$—; and $Z^3$ is a single bond or —COO—; and (b) at least one non-liquid crystal component.

2. The liquid crystal composition according to claim 1, wherein the third component is at least one compound represented by formula (3-2) in the range of approximately 10% to approximately 45% by weight, and the fourth component is at least one compound represented by formula (4-1) and at least one compound represented by formula (4-2) in the range of approximately 10% to approximately 55% by weight:

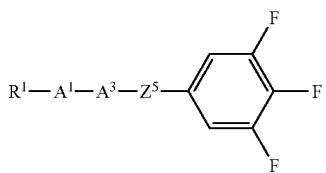

(3-2)

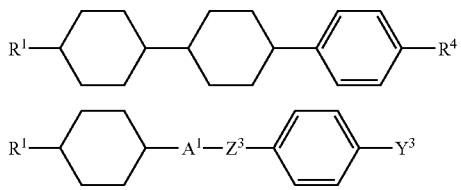

(4-1)

(4-2)

wherein $R^1$ is an alkyl group having 1 to 12 carbons; $R^4$ is an alkyl group having 1 to 12 carbons or an alkoxy group having 1 to 12 carbons; $Y^3$ is fluorine or chlorine; $A^1$ is 1,4-cyclohexylene or 1,4-phenylene; $A^3$ is 1,4-phenylene or 2,6-difluoro-1,4-phenylene; $Z^3$ is a single bond or —COO—; and $Z^5$ is a single bond or —CF$_2$O—.

3. The liquid crystal composition according to claim 1, wherein the third component is at least one compound represented by formula (3-2-7) in the range of approximately 10% to approximately 45% by weight, and the fourth component is at least one compound represented by formula (4-1) and at least one compound represented by formula (4-2) in the range of approximately 10% to approximately 55% by weight:

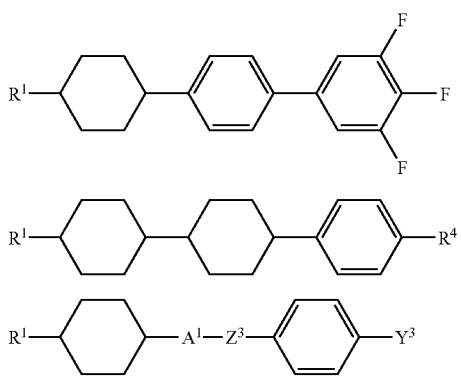

(3-2-7)

(4-1)

(4-2)

wherein $R^1$ is an alkyl group having 1 to 12 carbons; $R^4$ is an alkyl group having 1 to 12 carbons or an alkoxy group having 1 to 12 carbons; $Y^3$ is fluorine or chlorine; $A^1$ is 1,4-cyclohexylene or 1,4-phenylene; and $Z^3$ is a single bond or —COO—.

4. The liquid crystal composition according to claim 1, wherein the third component is at least one compound represented by formula (3-2-14) in the range of approximately 10% to approximately 45% by weight, the fourth component is at least one compound represented by formula (4-1) and at least one compound represented by formula (4-2) in the range of approximately 10% to approximately 55% by weight:

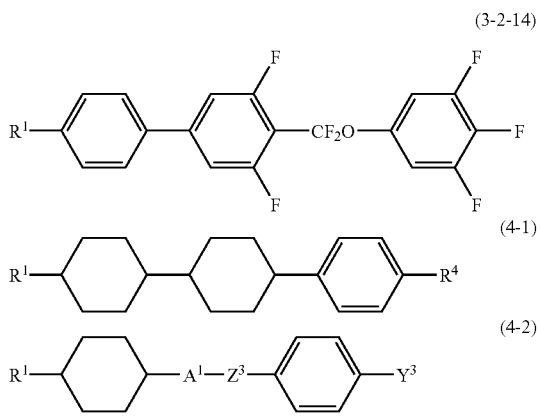

(3-2-14)

(4-1)

(4-2)

wherein $R^1$ is an alkyl group having 1 to 12 carbons; $R^4$ is an alkyl group having 1 to 12 carbons or an alkoxy group having 1 to 12 carbons; $Y^3$ is fluorine or chlorine; $A^1$ is 1,4-cyclohexylene or 1,4-phenylene; and $Z^3$ is a single bond or —COO—.

5. The liquid crystal composition according to claim 1, which further comprises an antioxidant.

6. The liquid crystal composition according to claim 5, wherein the antioxidant is the compound represented by formula (9):

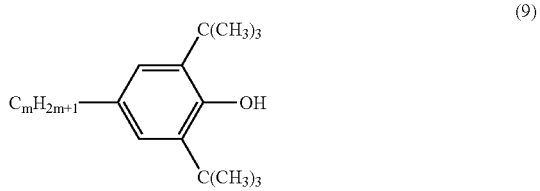

(9)

wherein m is an integer from 1 to 9.

7. The liquid crystal composition according to claim 6, wherein the antioxidant is in the range of approximately 50 to approximately 600 ppm based on the total weight of the liquid crystal compounds.

8. A liquid crystal display element comprising the liquid crystal composition according to claim 1.

* * * * *